(12) United States Patent
Barry et al.

(10) Patent No.: US 11,421,046 B2
(45) Date of Patent: Aug. 23, 2022

(54) ALIGNED ARRAYS OF NANORODS, AND METHODS OF MAKING AND USING THEM

(71) Applicant: BRANDEIS UNIVERSITY, Waltham, MA (US)

(72) Inventors: Edward Barry, Chicago, IL (US); Zvonimir Dogic, Arlington, MA (US); Michael Hagan, West Newton, MA (US); Yasheng Yang, Lexington, MA (US); Daniel Perlman, Arlington, MA (US)

(73) Assignee: BRANDEIS UNIVERSITY, Waltham, MA (US)

( * ) Notice: Subject to any disclaimer, the term of this patent is extended or adjusted under 35 U.S.C. 154(b) by 628 days.

(21) Appl. No.: 14/354,258

(22) PCT Filed: Oct. 24, 2012

(86) PCT No.: PCT/US2012/061612
§ 371 (c)(1),
(2) Date: Apr. 25, 2014

(87) PCT Pub. No.: WO2013/063060
PCT Pub. Date: May 2, 2013

(65) Prior Publication Data
US 2014/0302303 A1    Oct. 9, 2014

Related U.S. Application Data

(60) Provisional application No. 61/551,643, filed on Oct. 26, 2011.

(51) Int. Cl.
*C08G 65/48* (2006.01)
*C08L 71/02* (2006.01)
(Continued)

(52) U.S. Cl.
CPC ........ *C08B 37/0021* (2013.01); *B82B 3/0066* (2013.01); *C08G 65/48* (2013.01); *C08L 71/02* (2013.01); *Y10T 428/249921* (2015.04)

(58) Field of Classification Search
CPC ......... B82Y 30/00; B82Y 10/00; B82Y 15/00; B82Y 5/00; B82Y 20/00; B82Y 40/00;
(Continued)

(56) References Cited

U.S. PATENT DOCUMENTS

| 5,049,275 A | * | 9/1991 | Gillberg-Laforce ... | B01D 61/38 210/500.27 |
| 7,030,167 B2 | * | 4/2006 | Gunther ................. | B82Y 30/00 438/31 |

(Continued)

FOREIGN PATENT DOCUMENTS

WO    2012/174533 A2    12/2012

OTHER PUBLICATIONS

Qui et al., "Controlled growth of ZnO nanorod templates and TiO2 nanotube arrays by using porous TiO2 film as mask," J Sol-Gel Sci Technol 47:187-193 (2008).*
(Continued)

*Primary Examiner* — Shawn Mckinnon
(74) *Attorney, Agent, or Firm* — Troutman Pepper Hamilton Sanders LLP (Rochester)

(57) ABSTRACT

Described are methods for the assembly of monolayer, bilayer, or multi-layer structures composed of homogenous rod-like molecules and particles. Included are methods for tuning physical properties of the mono- or multi-layered structures by changing ionic conditions and the size or concentration of polymer used for self-assembly.

20 Claims, 8 Drawing Sheets

(51) Int. Cl.
*C08B 37/02* (2006.01)
*B82B 3/00* (2006.01)
(58) Field of Classification Search
CPC .... B22F 3/10; B22F 2998/10; B22F 2999/00; B22F 2201/10; B22F 2201/20; B22F 9/04; B22F 1/0025; B22F 1/004; C04B 2235/444
See application file for complete search history.

(56) References Cited

U.S. PATENT DOCUMENTS

| | | | | |
|---|---|---|---|---|
| 2006/0099135 A1* | 5/2006 | Yodh | | B82Y 10/00 423/447.1 |
| 2009/0029441 A1* | 1/2009 | Wang | | B82Y 5/00 435/235.1 |
| 2010/0255103 A1* | 10/2010 | Liong | | A61K 9/5094 424/489 |
| 2012/0325669 A1* | 12/2012 | Kim | | C07K 14/31 205/109 |

OTHER PUBLICATIONS

Shin et al., "Alignment of Polymeric Nanofibers Using a Filtering Effect," J. of Nanoscience and Nanotechnology vol. 8, 5404-5407 (2008).*

Barry et al., "Entropy Driven Self-assembly of Nonamphiphilic Colloidal Membranes," Proceedings of the National Academy of Sciences of the United States of America 107(23):10348-10353 (2010).*

Kubota et al., "Characterization of Poly(N-isopropylmethacrylamide) in Water;" Polymer Journal, vol. 22, No. 12, pp. 1051-1057 (1990).*

Baker et al., "Device-Scale Perpendicular Alignment of Colloidal Nanorods," Nano Lett., 10, 195-201 (2010).*

Johansson et al., "Rapid Synthesis of SBA-15 Rods with Variable Lengths, Widths, and Tunable Large Pores," Langmuir, 27, 4994-4999 (2011).*

TamilSelvan et al., "Preparation and characterization of highly ordered mesoporous SiC nanoparticles with rod shaped morphology and tunable pore diameters," J. Mater. Chem., 21, 8792 (2011).*

Zhuang et al., "Cylindrical Superparticles From Semiconductor Nanorods," J. Am. Chem. Soc. 131(17):6084-6085 (2009).

Wang et al., "Self-Assembled Colloidal Superparticles From Nanorods," Science 338:358-363 (2012).

Baranov et al., "Assembly of Colloidal Semiconductor Nanorods in Solution by Depletion Attraction," Nano Letters 10:743-749 (2010).

International search report and written opinion for corresponding application No. PCT/US2012/061612, dated Apr. 1, 2013.

Yang et al., "Self-assembly of 2D Membranes from Mixtures of Hard Rods and Depleting Polymers," Soft Matter 8:707-714 (2012) (published online Nov. 7, 2011).

* cited by examiner

ALIGNED ARRAYS OF NANORODS, AND METHODS OF MAKING AND USING THEM

RELATED APPLICATIONS

This application is a national stage application under 35 U.S.C. § 371 of International Patent Application No. PCT/US2012/061612, filed Oct. 24, 2012, which claims the benefit of priority to U.S. Provisional Patent Application Ser. No. 61/551,643, filed Oct. 26, 2011, the contents of which are hereby incorporated by reference.

GOVERNMENT SUPPORT

This invention was made with Government support under Grant Nos. NSF-MRSEC-0820492, NSF-DMR-095577, and NSF-DMR-0705855, awarded by the National Science Foundation, and Grant No. NIH-R01 AI080791, awarded by the National Institutes of Health. The Government has certain rights in this invention.

BACKGROUND

Nanostructured materials, in particular monolayer or multi-layer structures composed of aligned arrays of anisotropic nanocrystals or nanorods, have the potential to facilitate a new generation of electronic or semi-conductor devices, as well as the potential for use in filtration systems and biosensors. Important prerequisites to realization of these devices include the ability to assemble and align nanorods over large lengthscales (>1 mm$^2$) and tune physical properties of the final assemblages, including the density of rods and the inter-particle spacing between rods. To date, varying degrees of success have been achieved with a wide class of assembly pathways based on drying methods and controlled evaporation, electric field alignment (or combinations thereof), and directed growth from a supporting substrate. The inherent non-equilibrium nature of the assembly pathways, and the limited ranges over which physical properties of the resulting assemblages can be tuned, are factors limiting the applicability of these methods.

Nanorods fall into a general class of anisotropic particles with properties that are geometrically identical to that of a cylinder or spherocylinder; these particles are characterized by a well-defined length (L) and diameter (D). When made soluble and properly stabilized against coagulation stemming from strong attractive van der Waals interactions, nanorods can be dispersed in solution and will behave as colloidal particles. The behavior of colloidal particles can be understood from the theoretical framework of hard rods. As such, experimental results and theoretical predictions from studies based on rod-like colloids, such as filamentous viruses, should apply equally well to nanorods and may, therefore, be used as a basis for understanding the behavior of nanorods. In particular, just as filamentous viruses undergo liquid crystalline phase transitions into nematic and smectic phases, as predicted by theories based in equilibrium statistical mechanics, cadmium selenide, gold, and silver nanorods have been reported to undergo liquid crystalline phase transitions.

The solution-based self-assembly of monolayer and multi-layer arrays of aligned rod-like colloids (filamentous viruses) was recently reported. E. Barry and Z. Dogic. Proceedings of the National Academy of Sciences of the United States of America, 107(23): 10348-10353, 2010. Using simple mixtures of rods and non-adsorbing polymers, large arrays, roughly 4- to 5-orders of magnitude larger than the constituent particles themselves, were reported to self-assemble in solution. The requirements for this self-assembly were uniform rod-like particles and attractive interactions.

Further, at high polymer concentrations membrane stacking was driven by the attractive depletion potential, the range of which is determined by the radius of gyration of the depleting polymer. Unbinding of membranes with decreasing polymer concentration indicates that the effective interaction energy between two monolayers switches from attractive to repulsive. The primary goal of this work is to understand the molecular origin of such repulsive membrane-membrane interactions at intermediate polymer concentrations. Experiments revealed significant protrusions of rods from isolated colloidal membranes, the magnitude of which could be tuned by changing the concentration of non-adsorbing polymer. In contrast, these fluctuations were suppressed in stacked membranes.

It was proposed that the entropy penalty associated with suppressing protrusion fluctuations of individual rods as two membranes approach leads to repulsive interactions that stabilize isolated membranes under moderate osmotic pressure. However, other plausible factors could also stabilize membranes, including attractive interactions between virus tips and depletant molecules, repulsions due to bending (Helfrich) modes, or kinetic trapping of membrane intermediates.

It has been unclear how to generalize this method for arbitrary conditions and components, including, but not limited to, varying polymer sizes and compositions, solvent conditions, or varying degrees of flexibility, electrostatic charge, contour length, diameter, or combinations thereof of the rod-like molecules. Additionally, previous studies indicate that there exists only a small range of polymer sizes which will effectively work as a depletant. Z. Dogic, et al. Physical Review E, 69(5), 2004. In order to extend this method to other systems, such as those composed of nanorods, it is necessary to elucidate a greater understanding of the underlying principles involved in this assembly pathway and introduce the means by which it can be generalized and extended to cover a far greater range of component compositions and sizes.

SUMMARY OF THE INVENTION

In certain embodiments, the invention relates to a composition, wherein the composition comprises:
 a first solvent;
 a plurality of rod-shaped particles; and
 a polymer,
 wherein the rod-shaped particles are aligned substantially parallel to one another.

In certain embodiments, the invention relates to any one of the aforementioned compositions, wherein the composition is in the form of a monolayer, a bilayer, or a multi-layer.

In certain embodiments, the invention relates to a method of forming an array of aligned rod-shaped particles, comprising the step of:
 combining in a first solvent a plurality of rod-shaped particles and a polymer, thereby forming a first solution,
 wherein the properties of the first solution are sufficient to overcome normal repulsive forces between the rod-shaped particles and cause the rod-shaped particles to align substantially parallel to one another, thereby forming a first array of aligned rod-shaped particles.

In certain embodiments, the invention relates to a three-dimensional structure, comprising any one of the aforementioned compositions or two dimensional arrays.

In certain embodiments, the invention relates to a composition, wherein the composition comprises:
a plurality of pores aligned substantially parallel to one another.

In certain embodiments, the invention relates to a composition, wherein the composition comprises:
a cross-linked polymer; and
a plurality of pores
wherein the pores are aligned substantially parallel to one another.

DETAILED DESCRIPTION

Overview

Figure 1:
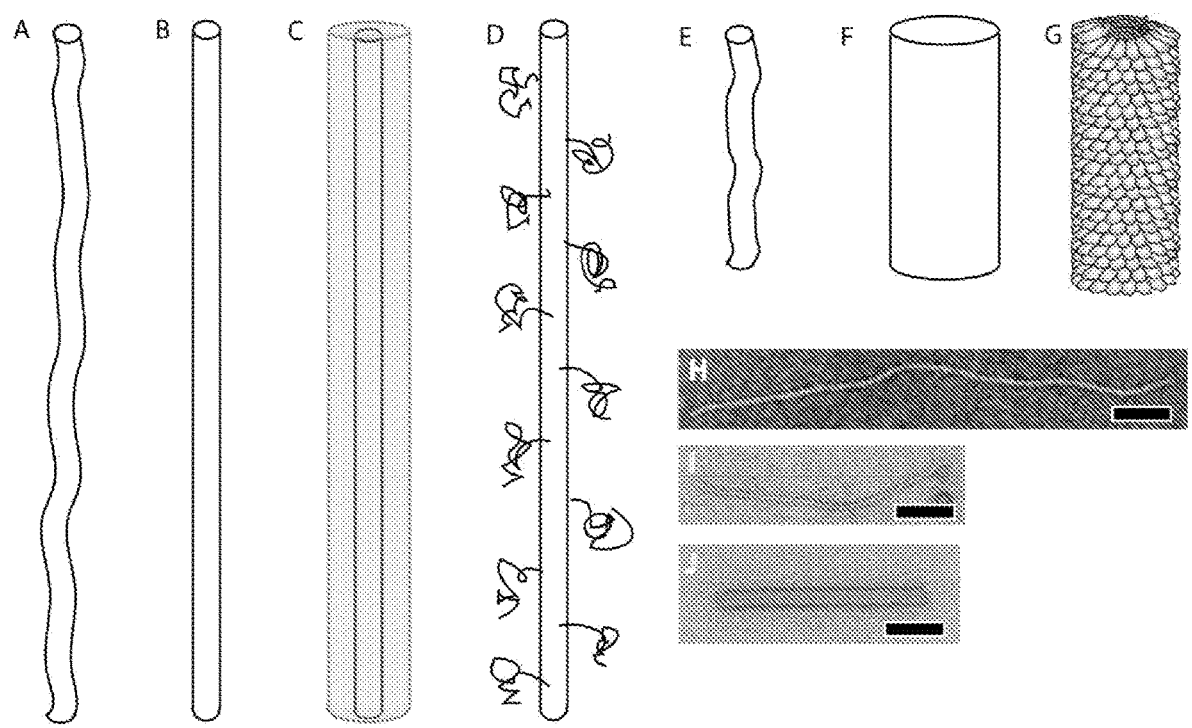
FIG. 1 depicts schematic representations of exemplary rod-like particles: (A) a slightly flexible rod-like particle, such as the fd wild type virus or the M13 virus, (B) a rigid rod-like particle, such as a nanorod or the fd Y21M virus, (C) a charge-stabilized rod-like particle, whereby the effective diameter is controlled by changing ionic conditions of the surrounding solvent, (D) a sterically stabilized rod-like particle, whereby the grafted chemical unit prevents coagulation due to attractive van der Waals forces, (E) a slightly flexible rod-like particle with a small aspect ratio due to a decrease in the length of the particle, such as the M13cp virus, and (F) a rigid low aspect ratio rod-like particle with a large diameter, such as the Tobacco Mosaic virus (TMV). (G) Schematic representations of the biopolymers fd and M13 viruses or the TMV with a coat protein encapsulating surrounding hollow core. Electron micrographs of the (H) fd virus, (I) M13cp virus, and (J) TMV are shown. All scale bars are 100 μm.
Figure 2:
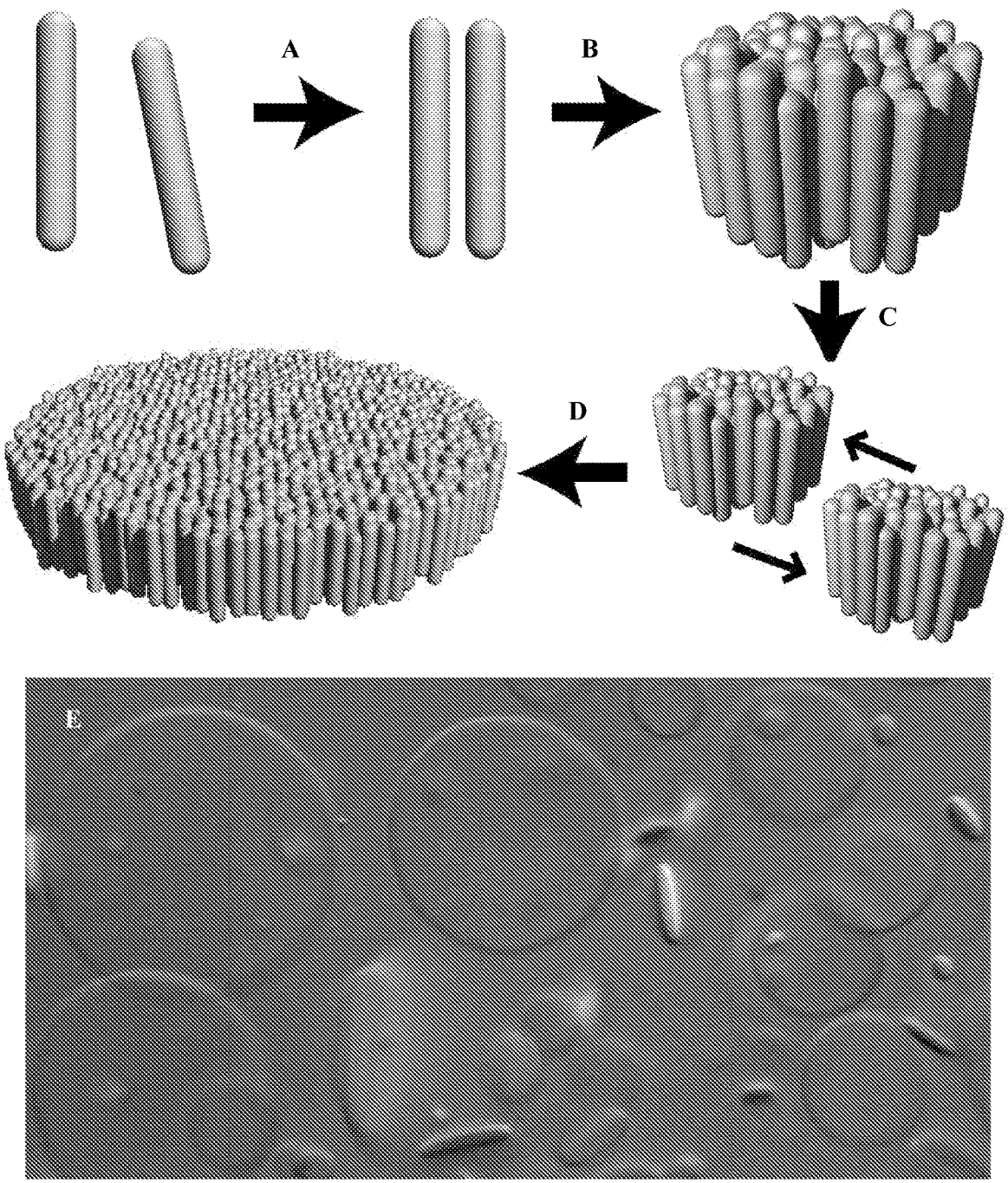
FIG. 2 depicts a schematic representation of an exemplary self-assembly pathway. (A) Polymer is added to a dilute suspension of rods. (B) As the distance between rods becomes smaller than the polymer diameter, the polymer is excluded from the region between rods, introducing an effective attraction between the rods (depletion interaction). The strength of the attraction is determined by the imbalance in osmotic pressure acting outside. (C) The effective two-body interaction leads to the formation of small seeds or rafts consisting of monolayers of aligned rods. (D) In a subsequent assembly pathway, seeds or rafts coalesce laterally. (D) The final monolayer structure is illustrated. (E) Differential Interference Contrast (DIC) image of the monolayer membrane assembly pathway.
Figure 3:
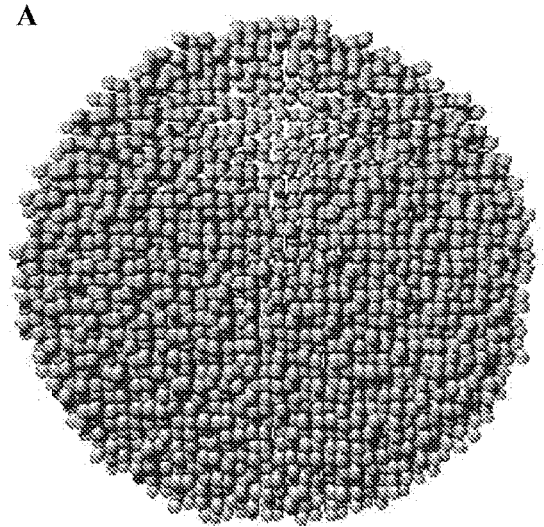
FIG. 3 depicts (A) Schematic (left) and DIC micrograph (right) of a membrane viewed from the face-on along the long the long axes of the rods. (B) Schematic (top) and polarization micrograph (bottom) of a membrane viewed from the edge on with the long axes of the rods lying in the plane of the paper. For illustrative purposes, the length of the rods in the schematics has been decreased by a factor of 30, and the density of rods within a membrane has been decreased by a factor of 10.
Figure 3:
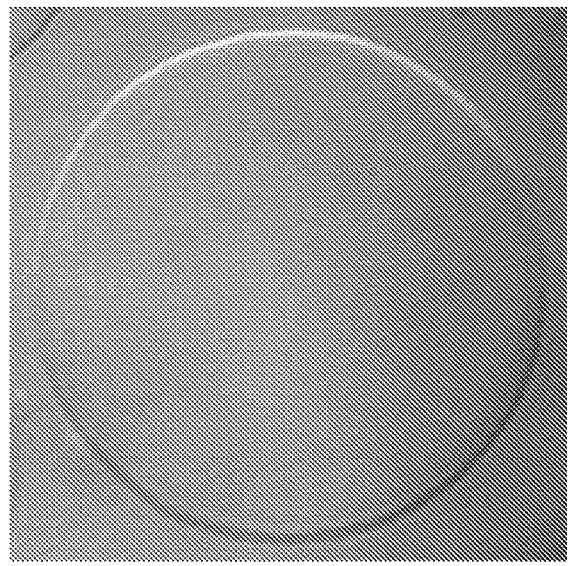
Figure 3:
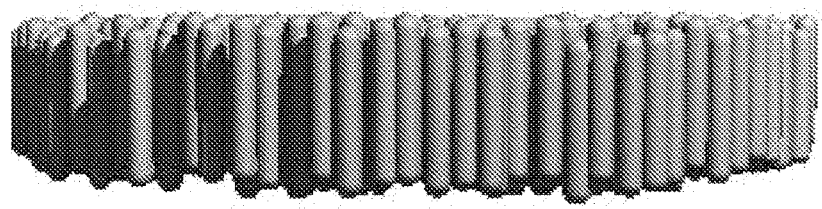
Figure 3:
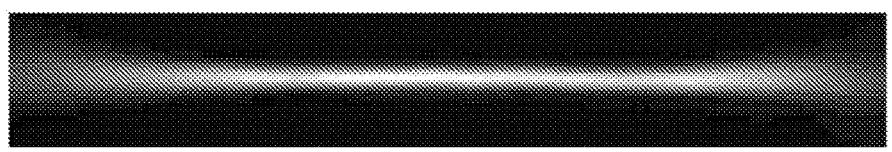
Figure 4:
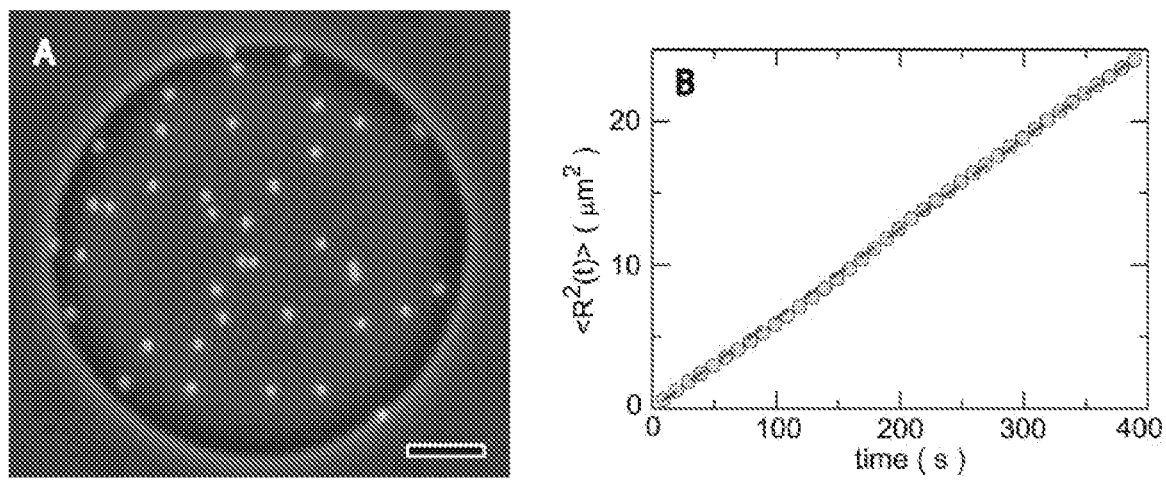
FIG. 4 depicts (A) Composite phase contrast and fluorescence micrograph, where approximately 1 out of 30,000 rods has been fluorescently labeled; scale bar is 5 μm. (B) Measuring the mean square displacements of individual rods, the internal structure is determined to be fluid-like under conditions used to assemble these membranes.
Figure 5:
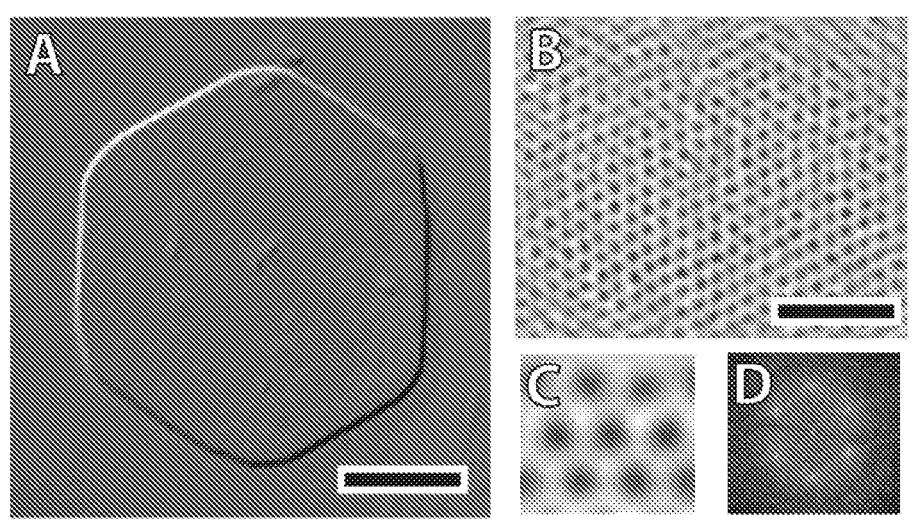
FIG. 5 is a schematic showing that by changing the size of the polymer, and the associated range of the attractive depletion interaction, the physical properties of the membranes at the continuum and molecular length-scales can be systematically tuned. (A) Membrane formed at low molecular weight PEG (MW=8000) showing a crystalline structure with hexagonal symmetry. Scale bar is 10 μm. (B) Hexagonal order observed at the molecular length-scales via Electron Tomography reconstruction. Here, the long axes of the rods are pointed into the plane of the paper and consequently the rods appear as isotropic dots. The mean inter-particle separation is 7 nm, with a density of approximately 19,000 particles/μm$^2$, roughly a factor of 4 larger than the fluid-like cases. Scale bar is 100 nm. (C) Close up view of the inset shown in (B), demonstrating molecular hexagonal order. Scale bar is 25 nm. (D) Fourier transform of the data shown in (B), clearly indicating that the constituent molecules are arranged with hexagonal order.
Figure 6:
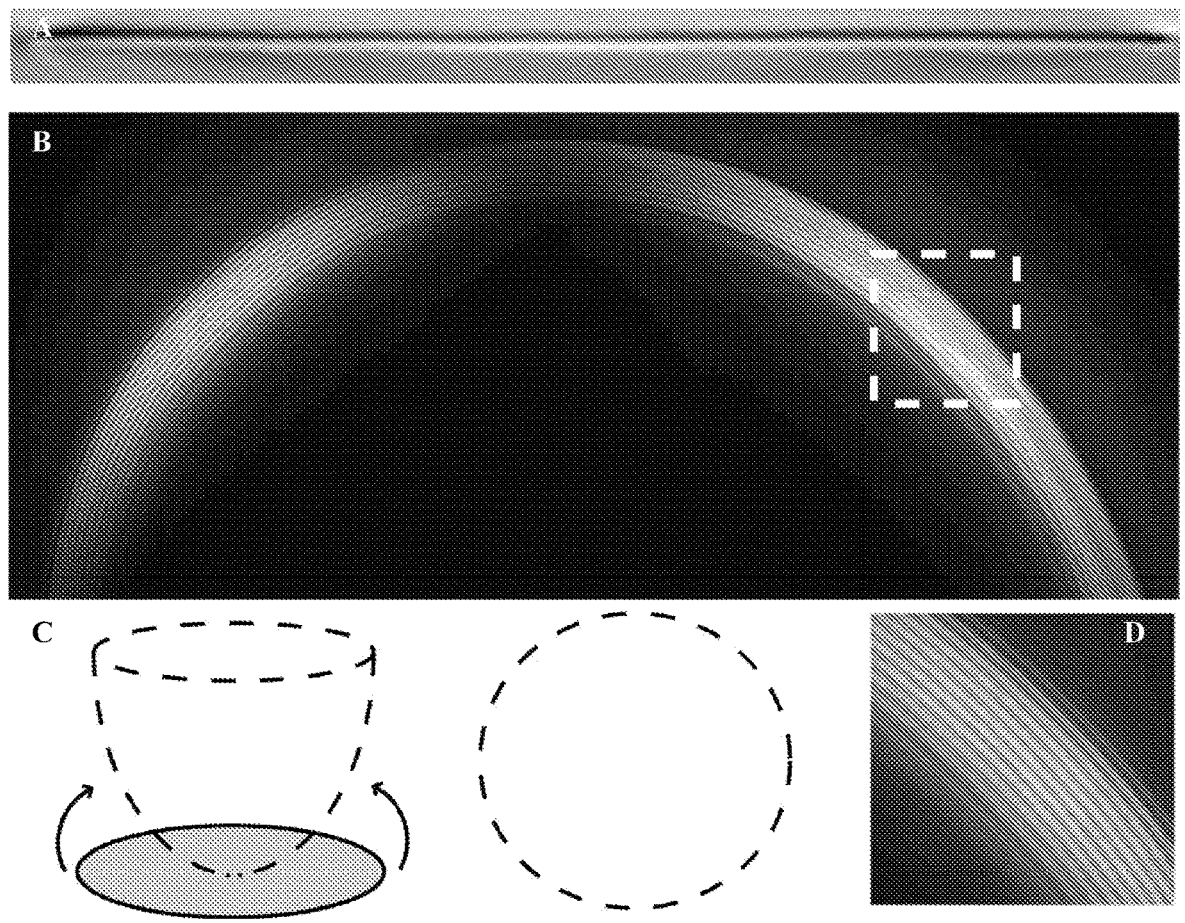
FIG. 6 depicts (A) a fluid-like membrane composed of the small aspect ratio M13cp viruses viewed from the edge-on. The small length of the rods leads to a low bending rigidity, and under certain cases allows for the formation of monolayer and multi-layer vesicles where the flat sheet closes upon itself (B) DIC micrograph of enclosed multi-layer vesicle. (C) Schematic representation of an assembly pathway where the membrane sheet closes upon itself (D) Close-up view of the edge, indicating that in this case, it is a multi-layer vesicle.
Figure 7:
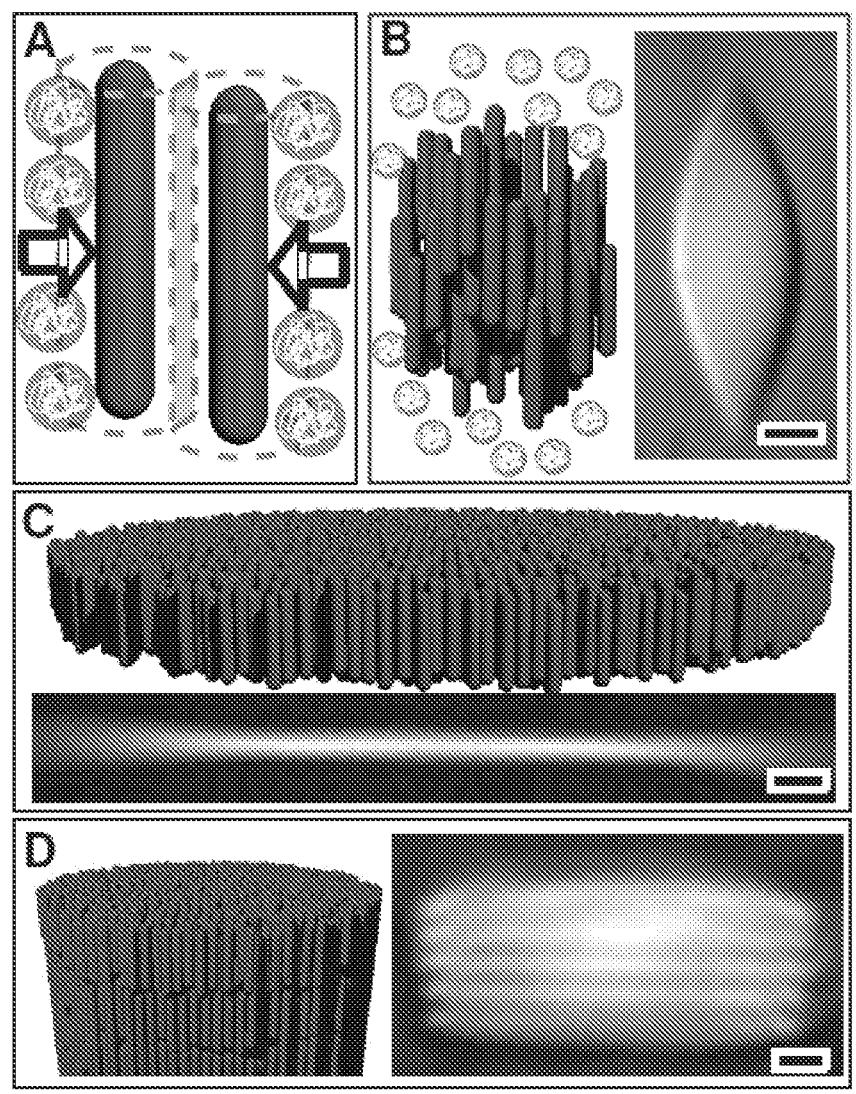
FIG. 7 depicts schematic illustrations and optical micrographs of the self-assembled structures observed in suspensions of the filamentous virus fd and non-adsorbing polymer. A) Non-adsorbing polymer induces effective attractive interactions between rods. B) DIC micrograph and schematic of a nematic tactoid formed at low depletant concentration. C) At intermediate depletant concentrations, rod-like viruses condense into macroscopic one rod-length 2D fluid-like membranes. D) At high depletant concentration, membranes stack on top of one another, forming smectic filaments. All scale bars are 5 μm.

In certain embodiments, the invention relates to a method for assembling homogenous rod-like molecules or particles into aligned monolayer arrays. In certain embodiments, the methods comprise forming multi-layer structures from more than one monolayer. In certain embodiments, the methods comprise adjusting internal properties of the arrays, such as the density of and inter-particle spacing between rods (porosity), the crystallinity or fluidity (regularity), or elasticity of the array. In certain embodiments, the rod-shaped particles are non-amphiphilic.

In certain embodiments, the invention relates to a method of assembling an array, wherein the array comprises a plurality of genetically modified viruses. In certain embodiments, the array may serve as a template for a nanostructured material. In certain embodiments, the genetically modified virus adsorbs or absorbs a metal atom or a metal ion onto its surface. In certain embodiments, the genetically modified virus adsorbs or absorbs a semi-conducting material onto its surface. In certain embodiments, the invention relates to any one of the aforementioned methods of assembling an array, further comprising the steps of biomineralizing on the surface of the virus; and heating the sample to remove any residual organic material (e.g., DNA or proteins). In certain embodiments, the resulting array would comprise a series of pores, which can then be used in applications. In certain embodiments, the invention relates to any one of the aforementioned methods, wherein the distance between pores is tunable. In certain embodiments, the invention relates to any one of the aforementioned methods, wherein the regularity of the pores is tunable.

In certain embodiments, the invention relates to the finding that entropic forces are sufficient to stabilize monolayer colloidal membranes at equilibrium. In certain embodiments, the width of the isolated colloidal membrane phase depends on aspect ratio or depletant size. In certain embodiments, the invention relates to a critical aspect ratio below which the colloidal membrane phase disappears. In certain embodiments, this result suggests that large aspect ratios dramatically alter the phase behavior. In certain embodiments, the invention relates to a method of qualitatively predicting the critical aspect ratio, comprising the step of monitoring the phase behavior of depletant and rods with varying lengths.

Not wishing to be bound by any particular theory, in certain embodiments the invention appears to leverage certain entropic interactions that are distinct from those characteristic of lipid bilayers. Membranes composed of small molecule lipids exhibit vigorous bending undulations due to their moderate bending moduli while the surface roughness is limited to molecular (Å) scales. Thus, their repulsive interactions are dominated by bending modes, albeit renormalized at short wavelengths by molecular protrusions. In contrast, in certain embodiments, the large aspect ratio of the fd virus (880 nm) enables molecular protrusions and corresponding entropic repulsions on colloidal scales. Second, the thickness of the colloidal membranes leads to a large bending modulus which suppresses bending modes. Consequently, protrusion interactions dominate on scales over which the depletion force (with range comparable to the depletant size ~10 nm) drives stacking of the colloidal membranes. Because this phenomenon requires only a large aspect ratio and a comparably small attractive force driving membrane formation, it enables the formation of thermodynamically stable membranes comprised of many other types of nanorods.

A computational model was developed that demonstrates that protrusion of individual virus particles is sufficient to stabilize membranes in equilibrium. In contrast to the previous model, which considered only protrusions of isolated rods, the results of studies related to the present invention indicate that collective protrusion undulations dominate repulsive interactions between membranes. Simulations predict that membranes are stable only for a certain range of rod aspect ratios and depletant sizes; in certain embodiments, the invention leverages the latter prediction.

Definitions

The term "monolayer" as used herein refers to a two-dimensional surface with a thickness in the third dimension that is determined by length of its constituent molecules. Examples of monolayers include, but are not limited to, membranes and thin films. Monolayers can be curved or flat.

The term "bilayer" as used herein refers to two monolayers stacked upon one another. Examples of bilayers include, but are not limited to, amphiphilic membranes, lipid membranes.

The term "multi-layer" as used herein refers to multiple monolayers stacked upon one another.

The term "homogenous" herein refers to those materials that are either: (i) uniform in composition or (ii) non-uniform in composition but do not differ in miscibility. Homogenous, as used herein, is intended to differentiate between classes of molecules that are amphiphilic in nature, such as lipids, and those that are not, i.e., those molecules whose self-assembly pathways are not determined by amphiphilic interactions. In amphiphilic molecules, covalent cross-linking between chemically heterogeneous regions, such as a hydrophobic chain and hydrophilic head, introduce a molecular frustration that acts to suppress macroscopic phase separation, and instead drives the formation of microphase separated structures such as micelles or membranes. When suspended in an apolar solvent such as water for example, lipids self-assemble into various structures to minimize the unfavorable interactions of the water with the hydrophobic tails. The paramount example of amphiphilic self-assembly has inspired the synthesis of numerous amphiphilic building blocks for membrane self-assembly including various block-copolymers, heterogeneous nanorods, and hybrid protein-polymer complexes. In certain embodiments of the present invention, amphiphilicity of the constituent molecules is not a prerequisite for membrane formation; thus, the possibility of assembling monolayer arrays from a wide class of homogenous macromolecular rod-like particles, such as nanorods that are homogenous and uniform in composition along the entire length of the particle, is possible.

The term "rod-shaped particles" as used herein refers to any anisotropic molecular or macromolecular species elongated in one spatial direction with geometrical properties identical to that of a cylinder or spherocylinder (a cylinder with spherical endcaps). Examples of rod-shaped particles include, but are not limited to, filamentous viruses and nanorods. As used herein, the terms "rod-like" and "rod-shaped" are used interchangeably. Rods are characterized by a well-defined length (L) and diameter (D), and their corresponding aspect ratio (L/D). The rods considered here have aspect ratios L/D>5, with diameters in the range of from about 2 nm to about 50 nm and lengths from about 10 nm to about 10 µm.

The term "nanorod" as used herein refers to any nanoparticle or any anisotropic molecular or macromolecular species elongated in one spatial direction with geometrical properties identical to that of a cylinder or spherocylinder (a cylinder with spherical endcaps) with one dimension less than about 100 nm. Examples of nanorods include, but are not limited to, nanowhiskers, nanowires, nanocylinders, and nanotubes. Nanorods have well-defined aspect ratios with diameters falling in the range of from about 2 nm to about 50 nm and have lengths from about 20 nm to about 10 µm.

The term "nanoparticle" as used herein refers to a particle with at least one dimension less than about 100 nm that is crystalline, amorphous, or any combination thereof. Classes of nanoparticles include those assembled from metal and semiconducting materials.

The term "nanocrystals" as used herein refers to crystalline nanoparticles.

The term "biomolecule" as used herein refers to molecules (e.g., proteins, amino acids, peptides, polynucleotides, nucleotides, carbohydrates, sugars, lipids, nucleoproteins, glycoproteins, lipoproteins, steroids, etc.) or collections thereof whether naturally occurring or artificially created (e.g., by synthetic or recombinant methods) that are commonly found in cells, tissues, and other biological systems. Specific classes of biomolecules include, but are not limited to enzymes, receptors, neurotransmitters, hormones, cytokines, cell response modifiers such as growth factors and chemotactic factors, antibodies, vaccines, haptens, toxins, interferons, ribozymes, anti-sense agents, plasmids, DNA, and RNA. Through genetic modifications of the viral DNA, it is possible to introduce binding sites for a wide class of biomolecules at both ends and along the surface of the virus. Arrays of genetically modified viruses then can serve as means by which to assemble 2D surfaces of biomolecules, which have potential applications for biosensors.

The term "polymer" as used herein refers to any globular macromolecular species with osmotic qualities. Examples of polymers include, but are not limited to, bovine serum albumin, polyethylene glycol, polyethylene oxide, and dextran. In certain embodiments, polymers are non-adsorbing and act as a depletant. In certain embodiments, polymer molecules can be grafted to the surfaces of nanorods. A polymer contains more than one monomeric repeat unit. For example, polyethylene glycol is $HO-(CH_2CH_2O)_n-H$, wherein n>1.

The terms "size of polymer" and/or "polymer size" herein refers to the size of the polymer as determined by the polymer radius of gyration, which in turn is determined by the molecular weight of the polymer. For example, in the case of polyethylene glycol and polyethylene oxide, the size of the polymer, specified by the polymer radius of gyration, $R_g$, is calculated from $R_g(\text{Å})=0.215M_w^{.583}$.

The term "porosity" as used herein refers to the porous nature of the assemblage as determined by the inter-particle spacing between rods.

The term "fluidity" as used herein refers to a disorganized internal structure, whereby there is little to no order in rods' lateral positions.

The term "crystallinity" as used herein refers to regularity in the rods' lateral position.

The term "elasticity" as used herein refers to the ability of the array to withstand elastic deformations.

Model Systems

In certain embodiments, filamentous viruses such as fd or M13 viruses, or Tobacco Mosaic viruses (TMV) were chosen as model rod-like molecules. In certain embodiments, these molecules were chosen for their unique advantages in demonstrating the feasibility and applicability of the methods used herein. For example, there are a number of important features that make fd and M13 ideal systems for the study of rod-like particles and drawing general conclusions and predictions about their behavior. First, important physical properties of the virus, such as the contour length, charge per unit length, and flexibility can all be tuned through standard methods of molecular cloning. Mutants that differ in their surface charge (such as fd and M13) exist naturally, while others can be created in the laboratory. The second important feature is that viruses are highly monodisperse or identical. Third, viruses can be modified chemically after they are expressed. One example of this feature is the ability to fluorescently label particles, enabling the visualization of individual viruses. This ability, coupled with the large size of the virus (~1 µm), enables a systematic investigation into the behavior of self-assembled structures simultaneously at the single particle and continuum lengthscales. Alternatively, TMV serves as an example of a small-aspect-ratio rod, with a much larger diameter and a far greater rigidity than that of bacteriophages (fd and M13). Moreover, by changing solvent conditions, the strength of repulsive (electrostatic) forces between particles may be varied in a systematic manner. These features have been used extensively in experimental studies focused on the phase behavior of pure rod systems, and such behavior provides a starting point for understanding the behavior of a wide class of other rod-like systems.

A seminal contribution to understanding entropic ordering transitions of hard rods was made by Lars Onsager, who showed that thin hard rods form nematic liquid crystals with increasing concentration. In the nematic phase, rods have orientational order and on average all lie parallel to a common axis characterized by the nematic director n, but there is no long range positional order (liquid-like). The Onsager prediction is that long hard rods, described by the length L and diameter D, undergo an ordering transition from a disordered isotropic phase to an ordered nematic phase at a volume fraction, Φ, given by Φ=4 (D/L) where Φ~LD²ρ and ρ=N/V is the number density. For large aspect ratio, the Onsager prediction implies that ordering transitions from a disorganized isotropic state to an aligned nematic state occurs at sufficiently low densities.

Onsager's prediction has been tested using many experimental systems. The use of filamentous viruses as model hard rod particles has been indispensable towards this end. In the case of filamentous viruses (e.g., fd, M13 and TMV), the rods only approximate the theoretical hard rod case, often having some electrostatic charge, a finite aspect ratio and flexibility, as well as some polydispersity. In order to describe their phase behavior and predict where the ordering transition occurs, these considerations must be taken explicitly into account. In certain embodiments, the invention relates to the phase behavior of pure rod systems as determined by experimental and theoretical studies of filamentous viruses and hard rods.

In the first instance, Onsager considered the effect of electrostatic interactions between rods. He began by introducing a charge and ionic strength dependent effective diameter, $D_{eff}$, to map the free energy of charged rods onto the free energy of hard rods. Consequently, the phase behavior of charged rods is identical to that of hard rods after scaling the hard core diameter, D, to an effective diameter, $D_{eff}$. In other words, the effective diameter defines the distance of separation between two rods for which the potential energy of repulsion equals the thermal energy averaged over the angular distribution of the rods. In practice, whereby the constituent rods are charged and interact through repulsive electrostatic interactions, solvent conditions control the strength of the electrostatic repulsion, with high concentrations of salt acting to screen out repulsive forces. In this way, solvent conditions and the respective electrostatic charge are incorporated into an ionic strength dependent effective diameter, and the rods behave as if they have a larger diameter than the hard core diameter. For example, TMV, which has a hard core diameter of 18 nm, has an effective diameter of $D_{eff}$~35 nm at an ionic strength of 7 mM.

For rods with some finite flexibility, it is also necessary to take into account the internal configurations of the semi-flexible chains in addition to the orientational and translational entropy. As first demonstrated by Khokhlov and Semenov (KS), the flexibility of rods dramatically alters the nature of the isotropic-nematic (I-N) phase transition. In a nematic phase, fluctuations of semi-flexible filaments are severely constrained, which imposes an additional free energy penalty associated with the formation of a nematic phase. It follows that the isotropic-nematic phase transition of semi-flexible rods is suppressed and occurs at higher particle densities when compared to a system of rigid rods. In the KS theory, the important parameter characterizing the semiflexible nature of the filaments is the ratio of contour length, L, to persistence length, p. Rods with L/p<0.1 can be treated as effectively rigid and their behavior is described by the original Onsager theory. As L/p increases above a value of 0.1, the flexibility significantly influences the nature of the transition. For rods with L/p~0.5 the location of the transition shifts to 30% higher densities when compared to rigid rods, the order parameter, S, of the coexisting nematic phase drops from S~0.8 to S~0.6, and the width of the coexistence region narrows from 30% to less than 10%.

Polydispersity, or a distribution in particle sizes, greatly influences the phase behavior of hard particle fluids. This problem was first considered by Lekkerkerker et al. for bidisperse solutions, and later for arbitrary lengths by several models. It follows that polydispersity widens the I-N coexisting region and shifts the transition to higher concentrations. There is also significant fractionation of rods, whereby longer rods preferentially partition into the nematic phase. This latter feature can be used as an effective means by which to fractionate stock solutions of rods.

The theoretical considerations described above outline the framework for understanding the behavior of experimental systems, and in particular the lyotropic phase behavior of viruses and nanorods. However, no theory for these systems is perfect. In the case of fd wild type (wt) and M13 viruses, coexistence concentrations of the isotropic and nematic phases fail to be described by the Onsager theory for hard rods. In both cases, the rod aspect ratio satisfies the criterion, but the value of L/p for fd wt and M13 is ~0.5, and therefore its phase transition is described by the KS theory. In contrast, the mutant fd Y21M in which a single point mutation in the amino-acid sequence of the major coat protein pVIII changes the persistence length of the virus by four-fold, L/p is 0.1, and its nematic phase transition is well described by the original Onsager theory for rigid rods. For the case of TMV, which is extremely rigid, L/p<<0.1; however, comparison with theory is extremely difficult because of the small aspect ratio (L/D~16)

With the advent of greater control over the size and shape of nanocrystals, nanorods with well-defined lengths and diameters can now be synthesized with tunable properties that help to stabilize the rods against coagulation stemming from strong attractive van der Waals forces. As expected, the same phase behavior observed in experimental studies based on filamentous viruses or theoretical studies based on idealized hard rods is recovered in systems composed of nanorods. Dispersion is a key challenge in achieving inorganic nanocylinder liquid crystalline phase formation. The kinetic stability of inorganic nanocylinder dispersions is affected by numerous factors including surface functionalization, long range attractive interactions and rod polarizability. In addition, material density must be considered. In spite of these challenges, liquid crystalline phase formation is being reported in a growing number of inorganic nanocylinder dispersions including boehmite, imogolite, goethite, rutile, cadmium selenide, gold, and silver nanocylinders. In this way, the generality and applicability of the filamentous virus system is self-evident, and can be used to generate a picture of general rules and guides to assembling other rod-like particles.

In pure rod suspensions, upon increasing the concentration further, hard rods undergo an entropically driven phase transition into a smectic phase. In the smectic phase, in addition to orientational order, there is one-dimensional positional ordering, whereby rods are constrained to lie in 2D layers stacked on top of one another. Inside each layer, there is no long range positional order (liquid-like). The number density of particles needed to reach the smectic phase is large in the pure rod systems, and therefore places limitations on its practical use. As is the case with the nematic phase, the exact location of the smectic phase transition is again highly dependent upon the aspect ratio of rods, and influenced by any finite rod flexibility. Furthermore, theoretical predictions and computer simulations place a lower limit on the rod aspect ratio below which hard rods will never form a smectic phase. In this case, L/D must be greater than 5. The smectic phase in filamentous viruses fd, M13, TMV, and CdSe nanorods has been reported previously. A finite flexibility in the case of fd and M13, and a small aspect ratio of TMV and CdSe nanorods makes comparison with theory extremely difficult.

The considerations outlined above apply for a system of purely repulsive rods. However, in certain embodiments, the invention relates to rods with attractive interactions. In certain embodiments, effective attractive interactions between the rods are introduced through the addition of a depleting agent, such as non-adsorbing polymers. When a hard particle is suspended in a polymer solution, an excluded volume shell is created around the particle from which the center of mass of a polymer is excluded. When two particles approach each other there is an overlap of the excluded volume shells, leading to an imbalance of the osmotic pressure that is exerted on each particle. This results in an effective attractive potential known as the depletion potential. The size of the depletant determines the range of interaction, and the number density, which is proportional to the concentration or volume fraction of depletant and thus the osmotic pressure, determines the strength of the interaction. In general, depletion forces are not restricted to polymers, but can also be exerted by other colloidal particles that are suspended in solution.

The behavior of spherical particles suspended in a depletion solution composed of polymers has been studied extensively. Most importantly, phase transitions to an organized crystalline state can be reached at concentrations that are only a fraction of that need in the pure sphere case. For example, hard spheres undergo an ordering transition from a disorganized to crystalline state at a volume fraction 0.494. Under appropriate conditions, as determined by the size and concentration of depleting agent, crystalline states can be reached at much smaller sphere volume fractions. This fact has important implications for the number of particles that must be synthesized and used to create ordered assemblies.

Unlike spherical molecules, the depletion potential between anisotropic particles such as rods is highly dependent on both their mutual orientation and their center of mass separation along the axial and radial directions. A pair of rods will minimize their interaction energy via lateral association, aligning parallel to one another.

The addition of polymers into suspensions of rod-like particles has been exploited extensively. However, the fact that the addition of polymer can lead to the self-assembly of organized structures remains much less exploited. For example, in a step usually referred to as polyethylene glycol (PEG) precipitation, large amounts of salt (NaCl, 25 g/L) and low molecular weight polyethylene glycol (PEG, MW=8 K, 25 g/L) are added to a dilute suspension of viruses; the viruses are condensed into small disorganized clusters which can then be extracted via centrifugation.

The addition of non-adsorbing polymer to a dilute suspension of colloidal fd viruses leads to the condensation of viruses into ordered structures, namely colloidal membranes, an equilibrium phase which consists of one rod-length thick liquid-like monolayers of aligned rods. Despite a very different structure on molecular lengthscales, the long-wavelength coarse-grained properties of colloidal membranes are remarkably similar to those of conventional lipid bilayers. In certain embodiments, the invention relates to the extension of these considerations to a wide class of conditions and components, thereby outlining a general framework and method for the assembly of such structures. In certain embodiments, the invention relates to methods by which important physical properties of the assemblages can be tuned in a systematic and controlled manner. In certain embodiments, the invention relates to the interplay between solvent conditions, and rod and polymer parameters. By changing these conditions and parameters, it is possible to tune the physical properties of the various assemblages.

In certain embodiments, the invention relates to the production of arrays of aligned rods from a variety of solvents based on careful selection of a depletant of an appropriate size. The following relation can be used as a guide for determining the approximate polymer size for a given rod diameter, rescaled to the rod effective diameter:

$R_g/D_{eff} \sim 1$

By varying this ratio, physical properties of the arrays can be tuned in a systematic manner. For example, at lower ratios the formation of solid-like or regular arrays is produced. In most cases, the size of the polymer, $R_g$, is related to its molecular weight, $M_w$, by a simple formula. For example, in the case of polyethylene glycol and polyethylene oxide, the radius of gyration is calculated from $R_g(\text{Å}) = 0.215 M_w^{0.583}$ In the cases where such an expression exists, according to the present invention, one can determine the size of the polymer needed to condense rod-like particles into aligned arrays. The amount of polymer needed, and the resulting osmotic pressure, is then determined by the strength of the repulsive interactions between rods.

Theoretical Estimates of Membrane-Membrane Interactions

The repulsive interactions between two membranes were theoretically estimated; these estimates provide important justification for an approximation of perfectly parallel cylinders used in some of the later simulations. All membrane-like structures, including molecular lipid bilayers and much larger colloidal membranes, have two generic repulsive interactions of distinct origin, which dominate at different separation lengthscales. At large separations, slowly decaying low energy bending (Helfrich) modes dominate. As two membranes approach each other within a mean surface separation distance $d_s$, undulation modes with wavelength $\lambda > d_s$ are suppressed by steric interactions. The suppression of progressively smaller wavelength modes with decreasing separation gives rise to a slowly decaying repulsive free energy per area:

$$g_{bend}(d_s) = \frac{3(k_B T)^2}{2\pi^2 \kappa_c d_s^2}, \tag{1}$$

with $\kappa_c$ the membrane bending modulus and $k_B T$ the thermal energy.

At small membrane separations, another repulsive force arises whose molecular origin is due to protrusions of molecules from the membrane surface. These interactions are important at separation distances comparable to the length scale at which molecules fluctuate away from the membrane surface, which depends on the size of the constituent particles. In molecular lipid bilayers these interactions are relevant on Angstrom lengthscales, while in colloidal membranes due to the length of the fd rods they can be significant at much larger membrane-membrane separations. While protrusion interactions were previously analyzed in the context of individual rods protruding from membranes, it is instead necessary to consider collective protrusion undulations. The free energy due to suppression of collective protrusion undulations yields the exponentially decaying repulsive free energy per area (calculation not shown)

$$g_{pr}(d) = B \exp\left[-\frac{\pi}{3} \frac{\gamma d_s^2}{k_B T}\right], \tag{2}$$

with B a pre-factor of order (1), and $\lambda$ the surface tension.

Figure 8:
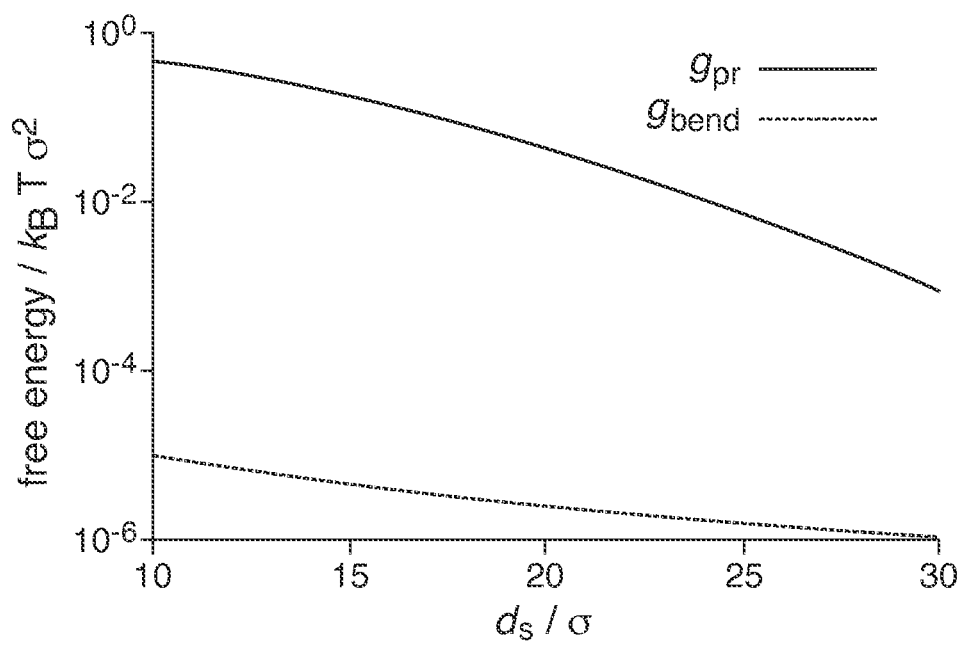
FIG. 8 depicts the contribution to membrane-membrane interaction free energies due to bending modes (solid line) as compared to the protrusion interaction (dashed line) with surface tension $\lambda = 1/134 \, k_B T \sigma^{-2}$, and bending modulus $\kappa = 150 \, k_B T$.

The relative contributions to repulsive membrane-membrane interactions from bending and protrusion modes (estimated from Eqs. 1 and 2) for parameters relevant to fd colloidal membranes are shown in FIG. 8. The bending modulus used was measured for fd membranes $\kappa_c = 150 k_B T^6$ which is large in comparison to $\kappa_c \approx 10\ k_B T$ for biological membranes, thus further weakening Helfrich repulsions. The experimentally inaccessible surface tension was estimated from simulations (described below) of colloidal membranes comprised of rods with L=100 at osmotic pressure ps=0:06, for which isolated membranes are stable. Using these experimentally relevant parameters it follows that, at experimentally relevant lengthscales, the strength of protrusion repulsion exceeds that of bending modes by at least four orders of magnitude (FIG. 8). While the exact ratio of the two contributions will depend on the value of the experimental surface tension, our estimates make it clear that the bending modes can be neglected due to the relatively short range of the depletion interactions and the large bending modulus of fd membranes. The relevant range of the membrane-membrane surface separation $d_s$ is determined by the range of attractive depletion interactions between a pair of membranes, since the repulsive entropic repulsive force needs to overcome the attractive depletion interaction in order to stabilize isolated membranes.

Simulation Model and Results

Model

The fd rods were modeled as hard spherocylinders with diameter $\sigma$ and length L. The non-adsorbing polymer was modeled as ghost spheres of diameter $\delta$ which freely interpenetrate one another but behave as hard spheres when interacting with rods. Compared with an effective pair potential approach, this model accounts for multi-rod interactions induced by polymers. Metropolis Monte Carlo (MC) with periodic boundary conditions were performed. The total number of rods $N_r$ is fixed, the sphere osmotic pressure $p_s$ is set by insertion/deletion moves, and constant pressure is maintained in the xy plane by performing volume-change moves, while the box size is fixed in z direction. Simulation results are reported with $\sigma$ as the unit of length, $k_B T$ as the unit of energy, and $k_B T \sigma^{-3}$ as the unit of pressure.

Based on the preeminence of protrusion modes (FIG. 8), which do not involve rod tilting, in most simulations spherocylinder orientations were assumed to be perfectly aligned along the z direction. This simplification greatly enhances computational efficiency. This approximation is justified by FIG. 8 and the fact that simulations in which the fixed orientation constraint is relaxed predict similar phase behavior and membrane-membrane interactions (e.g., FIG. 9). Further simulation details are given in the Exemplification section.

Results

Membrane-Membrane Interaction Potential

Figure 9:
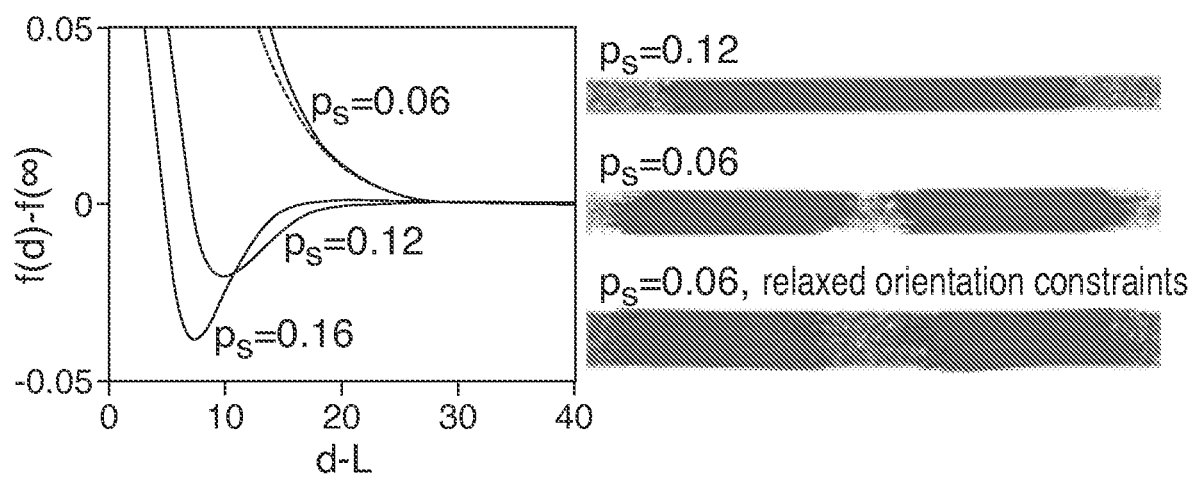
FIG. 9 depicts (left) free energy per rod of an interacting membrane pair, $f(d)-f(\infty)$, plotted as a function of membrane surface separation d–L, shown for three different depletant concentrations indicated by values of $p_s$, with sphere diameter $\delta = 1:5$ and aspect ratio L=100. The dashed line is the free energy calculated with orientational fluctuations at $p_s = 0:06$. (right) Snapshots of two membranes from unbiased trajectories. (top) Membranes attract at $p_s = 0:12$. (middle, bottom) Snapshots for $p_s = 0:06$ from simulations with (middle) parallel rods and (bottom) rods with orientation fluctuations. In both cases membranes drift apart, indicative of a repulsive potential

Umbrella sampling was used to measure the free energy per rod f, as a function of the separation between the centers of mass of two membranes, d (FIG. 9). At low osmotic pressures (e.g., $p_s$=0:06), f(d)–f($\infty$) has no attractive region sufficient to overcome translational entropy; i.e., the stacking of disks is suppressed and the isolated colloidal membrane phase is stable. For larger osmotic pressures ($p_s \geq 0:08$), the free energy has a substantial minimum at finite membrane separations, signifying that membranes will stack to form the smectic-like columns. Consistent with these free energy results, unbiased simulations for these parameters resulted in two membranes which were respectively isolated and stacked at low and high osmotic pressures, as shown in FIG. 9 (right). The free energy and a representative snapshot are also shown for rods with orientational fluctuations at $p_s$=0:06. Note that isolated membranes are stable and the interaction free energy is comparable to the case with parallel rods; the repulsion is slightly weaker with orientational fluctuations because they decrease the equilibrium areal rod density. This simulation result further justifies the assumption to neglect the bending modes which involve bending of rods away from layer normal and focus on simulations of perfectly aligned rods which accurately account for protrusion fluctuations.

Phase Diagram

Figure 10:
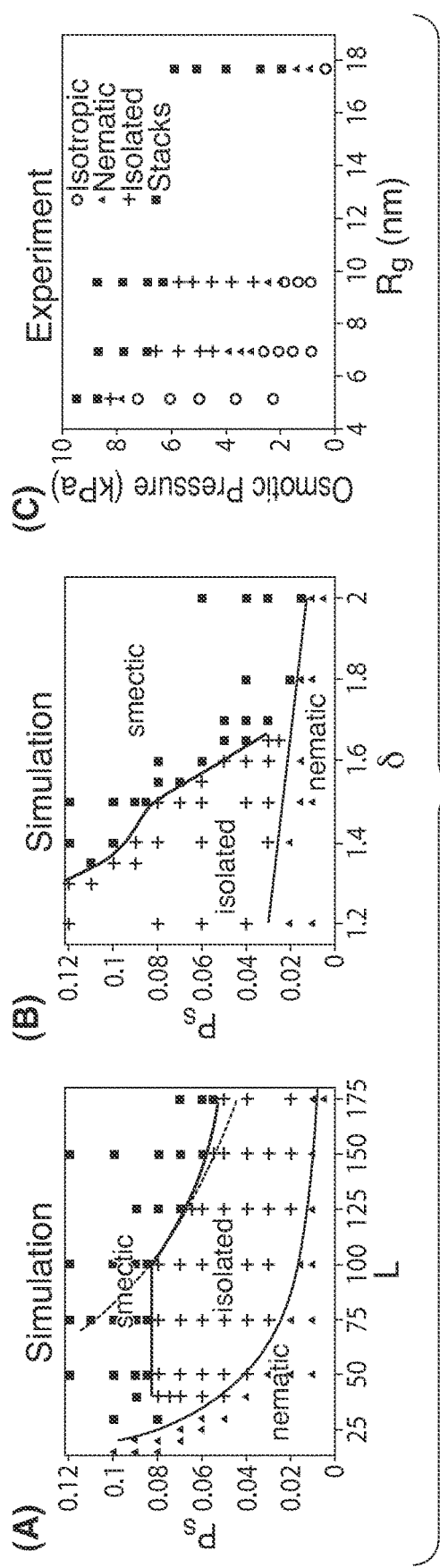
FIG. 10 depicts phase diagrams from simulation and experiment. Triangles ▲ denote parameters that lead to nematic configurations, + symbols correspond to isolated membranes (monolayer arrays), and ■ symbols correspond to smectic layers (multilayer arrays). (A), (B) Phase diagrams determined from simulations for varying osmotic pressure $p_s$ and (A) aspect ratio L with sphere diameter (polymer radius of gyration) $\delta = 1:5$, and (B) varying sphere diameter with L=100. The solid lines identify the isolated membrane/smectic and nematic/isolated membrane phase boundaries. They are fit by eye to simulation results except for the nematic/isolated membrane boundary in (A), which is a theoretical prediction. (C) The experimental phase diagram corresponding to (B) using mixtures of fd viruses and PEG/PEO polymers. The final concentration of viruses was fixed at 5 mg/mL and both polymer concentration and molecular weight were varied to change osmotic pressure and polymer radius of gyration, $R_g$, respectively. As noted in the text, chiral structures, such as helical ribbons, which appear near the nematic and isolated membrane boundary, are not shown.

The equilibrium phase behavior was calculated as a function of osmotic pressure, rod aspect ratio, and sphere diameter as follows (FIG. 10). To identify the nematic-membrane phase boundary, separate unbiased simulations were performed starting from initial conditions in which (1) rods have random positions and (2) rods are aligned in a flat layer. For all results shown, the simulation outcomes were independent of initial conditions. To identify the transition from membranes to smectic filaments, a parameter set was considered to yield smectic layers if the total free energy of the attractive basin in the membrane-membrane interaction potential is sufficient to overcome the membrane translational entropy $F \leq F_0 = k_B T \ln \rho_m v_0$ $\exp(-\beta F) = \int_{f(s)<0} d_s \exp(-2\beta M f(s))$ (3)

with M the number of rods in one membrane, $v_0$ a standard state volume, and $\rho_m$ a membrane concentration. It was estimated that M=104 and $\rho_m v_0 = 10^{-8}$ from the experimental conditions; the location of the phase boundary is not sensitive to the value of $\rho_m v_0$.

FIG. 10A illustrates the location of the equilibrium nematic phase, isolated membranes, and smectic stacks as a function of rod aspect ratio and depletant concentration. Interestingly, isolated membranes are thermodynamically stable over a significant span of osmotic pressures, but only for rods with aspect ratios larger than L=30. Simulations with orientational fluctuations also indicated a minimum aspect ratio for stable membranes, which is somewhat larger. These predictions were consistent with previous simulations of rods with L=5 that did not find equilibrium monolayers. The disappearance of the isolated membrane phase for shorter rods arises from the interplay between the geometry of rod-like particles and attractive depletion interactions. Since the strength of the attractive interaction between two rods scales linearly with rod length, increasing the rod length lowers the osmotic pressure associated with the nematic to membrane transition. On the other hand, the transition from isolated membranes to smectic filaments is determined by the roughness of colloidal membranes, which is independent of rod length but decreases with increasing depletant concentration. Based on this argument, the location of the transition between colloidal membranes and smectic filaments should be independent of rod length, which is indeed observed for rod lengths between 30 and 100. For longer rods the location of the transition slightly decreases with increasing rod length, due to 2D crystallization of rods within membranes. At a critical rod length the nematic-membrane phase boundary intersects the membrane-smectic filament phase boundary, ending the equilibrium membrane phase.

FIG. 10B reveals that the depletant size $\delta$ significantly influences the topology of the phase diagram. For $\delta > 1:7$ colloidal membranes are unstable at all osmotic pressures and there is a direct transition from the nematic phase to smectic filaments. In contrast, for δ<1:7 colloidal membranes are the equilibrium phase at intermediate depletant concentrations between a low osmotic pressure nematic phase and high osmotic pressure smectic filament phase. Decreasing the depletant size further below this critical value significantly expands the range of osmotic pressures for which colloidal membranes are stable. These results can be understood as follows. Increasing the depletant size expands the effective range of the attractive potential between two colloidal membranes, which in turn requires longer range repulsive interactions to stabilize colloidal membranes. For large enough depletant molecules, the repulsive protrusion interactions are not sufficiently long-ranged to overcome the attractive potential and colloidal membranes become unstable for all osmotic pressures.

Origins of Monolayer Stability

Figure 11:
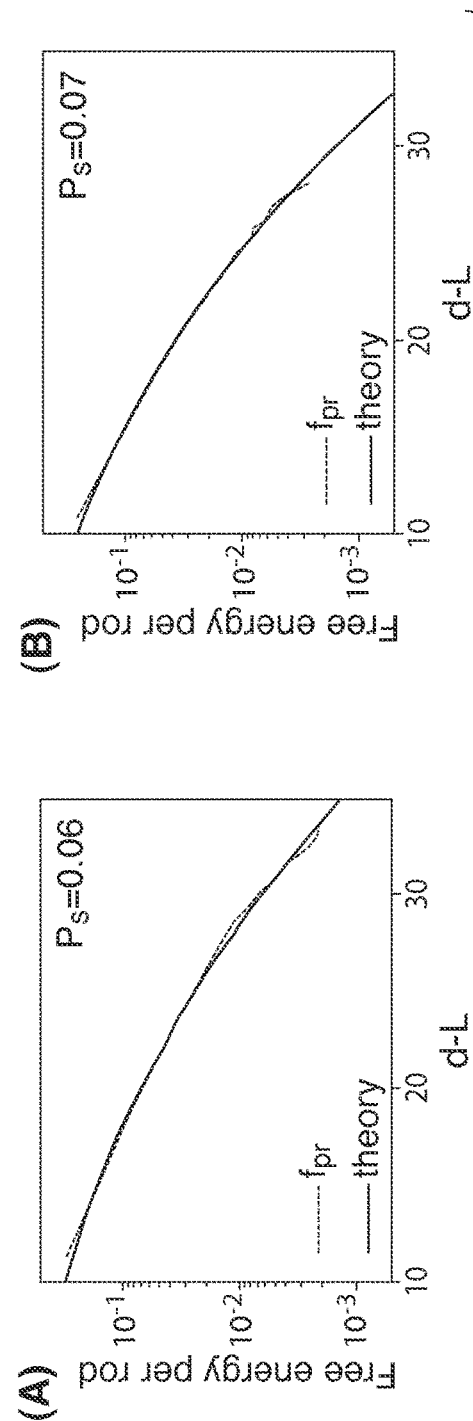
FIG. 11 depicts the relationship between the theoretical protrusion interaction potential and the repulsive interaction potential $f_{pr}$ measured from simulations (dotted lines). The solid lines correspond to the best fit to the protrusion undulation potential given in the text with B and λ as fit parameters. Parameters are L=100, δ=1:5 and (A) $p_s$=0:06, (B) $p_s$=0:08 and the best fit values are (A) B=0:8, $\gamma^{-1}$=213, (B) B=0:9, $\gamma^{-1}$=156.

To understand the nature of the repulsive membrane-membrane interactions, their functional form $f_{pr}$ was determined by subtracting the depletion interaction $f_d$ from the measured membrane-membrane free energy, $f_{pr}(d_s)=f(d)-f_d$ (d), with d the distance between the centers of mass of each membrane. The depletion term is given by $f_d(d)=p_s\langle v_{ex}\rangle_{ds}$, where $v_{ex}$ is the volume excluded to spheres by rods, and $\langle \cdot \rangle_d$ indicates an ensemble average over configurations at a particular separation d. Finally, the mean surface separation is given by $d_s=d-L$. As shown in FIG. 11, the measured repulsive interaction $f_{pr}$ is well described by the functional form Eq. 2, with fit values of λ that are close to the surface tension extracted from simulated height-height correlation spectra (data not shown). This agreement establishes that the simulated membrane-membrane repulsion primarily arises from collective protrusion undulations.

Exemplary Compositions

In certain embodiments, the invention relates to a composition, wherein the composition comprises:
 a first solvent;
 a plurality of rod-shaped particles; and
 a polymer,
 wherein the rod-shaped particles are aligned substantially parallel to one another.

In certain embodiments, the invention relates to any one of the aforementioned compositions, wherein the composition is in the form of a monolayer, a bilayer, or a multi-layer.

In certain embodiments, the invention relates to any one of the aforementioned compositions, wherein the composition further comprises a salt. In certain embodiments, the invention relates to any one of the aforementioned compositions, wherein the salt is monovalent. In certain embodiments, the invention relates to any one of the aforementioned compositions, wherein the salt is sodium chloride or potassium chloride. In certain embodiments, the invention relates to any one of the aforementioned compositions, wherein the salt is sodium chloride; and the sodium chloride is present in a concentration from about 1 mM to about 500 mM. In certain embodiments, the invention relates to any one of the aforementioned compositions, wherein the salt is sodium chloride; and the sodium chloride is present in a concentration of about 50 mM.

In certain embodiments, the amount of salt determines the effective diameter of the rod-shaped particles. In certain embodiments, the concentration of salt dictates the size of the polymer. In certain embodiments, the concentration of salt is dependent upon the surface charge of the rod-shaped particles.

In certain embodiments, the presence of divalent cations can lead to an attractive force between particles. In certain embodiments, including divalent cations in the solvent may reduce the amount of polymer needed to condense the particles into arrays.

In certain embodiments, the invention relates to any one of the aforementioned compositions, wherein the composition further comprises tris(hydroxymethyl)aminomethane-HCl (tris-HCl). In certain embodiments, the invention relates to any one of the aforementioned compositions, wherein the tris-HCl is present in a concentration from about 1 mM to about 500 mM. In certain embodiments, the invention relates to any one of the aforementioned compositions, wherein the tris-HCl is present in a concentration from about 1 mM to about 15 mM. In certain embodiments, the invention relates to any one of the aforementioned compositions, wherein the tris-HCl is present in a concentration of about 10 mM. In certain embodiments, the invention relates to any one of the aforementioned compositions, wherein the tris-HCl is present in a concentration of about 3.5 mM.

In certain embodiments, the invention relates to any one of the aforementioned compositions, wherein the composition further comprises a buffer.

In certain embodiments, the invention relates to any one of the aforementioned compositions, wherein the composition has a pH from about 2.0 to about 12.0. In certain embodiments, the invention relates to any one of the aforementioned compositions, wherein the composition has a pH from about 4.0 to about 10.0. In certain embodiments, the invention relates to any one of the aforementioned compositions, wherein the composition has a pH of about 8.0.

In certain embodiments, the invention relates to any one of the aforementioned compositions, wherein the solvent is an organic solvent or an inorganic solvent. In certain embodiments, the invention relates to any one of the aforementioned compositions, wherein the solvent is organic. In certain embodiments, the invention relates to any one of the aforementioned compositions, wherein the solvent is inorganic. In certain embodiments, the invention relates to any one of the aforementioned compositions, wherein the solvent comprises an organic solvent and an inorganic solvent.

In certain embodiments, the invention relates to any one of the aforementioned compositions, wherein the rod-shaped polymers do no adsorb the polymer.

In certain embodiments, the invention relates to any one of the aforementioned compositions, wherein the polymer comprises polyethylene glycol and polyethylene oxide.

In certain embodiments, the invention relates to any one of the aforementioned compositions, wherein the polymer comprises dextran.

In certain embodiments, the invention relates to any one of the aforementioned compositions, wherein the polymer comprises dextran with a number average molecular weight of from about 1,000 Da to about 2,000,000 Da. In certain embodiments, the invention relates to any one of the aforementioned compositions, wherein the polymer comprises dextran with a number average molecular weight of from about 200,000 Da to about 800,000 Da.

In certain embodiments, the invention relates to any one of the aforementioned compositions, wherein the polymer comprises dextran with a number average molecular weight of about 500,000 Da.

In certain embodiments, the invention relates to any one of the aforementioned compositions, wherein the dextran is present in the composition at a concentration from about 1 mg/mL to about 80 mg/mL. In certain embodiments, the invention relates to any one of the aforementioned compositions, wherein the dextran is present in the composition at a concentration from about 30 mg/mL to about 60 mg/mL.

In certain embodiments, the invention relates to any one of the aforementioned compositions, wherein the dextran is present in the composition at a concentration of about 40 mg/mL.

In certain embodiments, the invention relates to any one of the aforementioned compositions, wherein the dextran is present in the composition at a concentration of about 58 mg/mL.

In certain embodiments, the invention relates to any one of the aforementioned compositions, wherein the polymer comprises polyethylene glycol.

In certain embodiments, the invention relates to any one of the aforementioned compositions, wherein the polymer comprises polyethylene glycol with a number average molecular weight of from 100 Da to about 10,000,000 Da. In certain embodiments, the invention relates to any one of the aforementioned compositions, wherein the polymer comprises polyethylene glycol with a number average molecular weight of from about 300 Da to about 10,000,000 Da. In certain embodiments, the invention relates to any one of the aforementioned compositions, wherein the polymer comprises polyethylene glycol with a number average molecular weight of from about 2,000 Da to about 700,000 Da.

In certain embodiments, the invention relates to any one of the aforementioned compositions, wherein the polymer comprises polyethylene glycol with a number average molecular weight of about 400,000 Da.

In certain embodiments, the invention relates to any one of the aforementioned compositions, wherein the polyethylene glycol is present at a concentration from about 1 mg/mL to about 60 mg/mL. In certain embodiments, the invention relates to any one of the aforementioned compositions, wherein the polyethylene glycol is present at a concentration from about 1 mg/mL to about 20 mg/mL.

In certain embodiments, the invention relates to any one of the aforementioned compositions, wherein the polymer comprises poly(N-isopropylacrylamide).

In certain embodiments, the invention relates to any one of the aforementioned compositions, wherein the polymer has a $R_g$ of from about 0.32 nm to about 80 nm. In certain embodiments, the invention relates to any one of the aforementioned compositions, wherein the polymer has a $R_g$ of from about 0.5 nm to about 80 nm. In certain embodiments, the invention relates to any one of the aforementioned compositions, wherein the polymer has a $R_g$ of from about 4 nm to about 40 nm.

In certain embodiments, the invention relates to any one of the aforementioned compositions, wherein the rod-shaped particles are substantially homogeneous.

In certain embodiments, the invention relates to any one of the aforementioned compositions, wherein the rod-shaped particles are selected from the group consisting of rigid rod-shaped particles and non-rigid rod-shaped particles.

In certain embodiments, the invention relates to any one of the aforementioned compositions, wherein the rod-shaped particles are responsive to an energy source that enables energy-dependent movement of the particles.

In certain embodiments, the invention relates to any one of the aforementioned compositions, wherein the rod-shaped particles comprise microtubules and nanomotors.

In certain embodiments, the invention relates to any one of the aforementioned compositions, wherein the rod-shaped particles are selected from the group consisting of substantially homogeneous rod-shaped viruses and virus-like particles.

In certain embodiments, the invention relates to any one of the aforementioned compositions, wherein the rod-shaped particles are selected from the group consisting of Tobacco Mosaic viruses, fd viruses, and M13 viruses.

In certain embodiments, the invention relates to any one of the aforementioned compositions, wherein the rod-shaped particles are fd wild type viruses.

In certain embodiments, the invention relates to any one of the aforementioned compositions, wherein the rod-shaped particles are fd Y21M viruses.

In certain embodiments, the invention relates to any one of the aforementioned compositions, wherein the rod-shaped particles are M13 viruses.

In certain embodiments, the invention relates to any one of the aforementioned compositions, wherein the rod-shaped particles are Tobacco Mosaic viruses.

In certain embodiments, the invention relates to any one of the aforementioned compositions, wherein the rod-shaped particles are viruses; and the viruses have been genetically modified to introduce binding sites along the surface of the viruses. See, for example, US 2011/0124488, US 2011/0197711, and US 2009/0269619, all of which are incorporated by reference.

In certain embodiments, the invention relates to any one of the aforementioned compositions, wherein the rod-shaped particles are selected from the group consisting of nanorods, nanowires, nanocylinders, and nanotubes.

In certain embodiments, the invention relates to any one of the aforementioned compositions, wherein the rod-shaped particles comprise organic material, inorganic material, or both.

In certain embodiments, the invention relates to any one of the aforementioned compositions, wherein the rod-shaped particles comprise silver, gold, germanium, cadmium selenide, zinc oxide, or silicon.

In certain embodiments, the invention relates to any one of the aforementioned compositions, wherein the rod-shaped particles are present in the composition at a concentration from about 0.1 mg/mL to about 100 mg/mL. In certain embodiments, the invention relates to any one of the aforementioned compositions, wherein the rod-shaped particles are present in the composition at a concentration from about 0.2 mg/mL to about 40 mg/mL.

In certain embodiments, the invention relates to any one of the aforementioned compositions, wherein the rod-shaped particles are present in the composition at a concentration of about 5 mg/mL.

In certain embodiments, the invention relates to any one of the aforementioned compositions, wherein the rod-shaped particles are from about 0.5 nm to about 50 nm in diameter. In certain embodiments, the invention relates to any one of the aforementioned compositions, wherein the rod-shaped particles are from about 2 nm to about 50 nm in diameter.

In certain embodiments, the invention relates to any one of the aforementioned compositions, wherein the rod-shaped particles are about 10 nm in diameter.

In certain embodiments, the invention relates to any one of the aforementioned compositions, wherein the rod-shaped particles are about 35 nm in diameter.

In certain embodiments, the invention relates to any one of the aforementioned compositions, wherein the rod-shaped particles have a persistence length from about 1 μm to about 20 mm.

In certain embodiments, the invention relates to any one of the aforementioned compositions, wherein the rod-shaped particles have a persistence length of about 2.8 μm.

In certain embodiments, the invention relates to any one of the aforementioned compositions, wherein the rod-shaped particles have a persistence length of about 9.9 μm.

In certain embodiments, the invention relates to any one of the aforementioned compositions, wherein the rod-shaped particles have an aspect ratio (L/D) greater than about 5.

In certain embodiments, the invention relates to any one of the aforementioned compositions, wherein the rod-shaped particles have an aspect ratio from about 5 to about 1000.

In certain embodiments, the invention relates to any one of the aforementioned compositions, wherein the rod-shaped particles are separated by a distance. In certain embodiments, the distance between rod-shaped particles is the distance from the center of one particle to the center of another. In certain embodiments, the distance between rod-shaped particles is the distance between the long edge of one particle to the long edge of another. In certain embodiments, the invention relates to any one of the aforementioned compositions, wherein the rod-shaped particles are separated by a distance of from about 0.5 nm to about 100 nm. In certain embodiments, the invention relates to any one of the aforementioned compositions, wherein the rod-shaped particles are separated by an average distance of from about 0.5 nm to about 100 nm.

In certain embodiments, the invention relates to any one of the aforementioned compositions, wherein the rod-shaped particles are separated by a distance of about 10 nm. In certain embodiments, the invention relates to any one of the aforementioned compositions, wherein the rod-shaped particles are separated by an average distance of about 10 nm.

In certain embodiments, the invention relates to any one of the aforementioned compositions, wherein the rod-shaped particles are separated by a distance of about 7 nm. In certain embodiments, the invention relates to any one of the aforementioned compositions, wherein the rod-shaped particles are separated by an average distance of about 7 nm.

In certain embodiments, the invention relates to any one of the aforementioned compositions, wherein the ratio of the effective diameter of the rod-shaped particles to $R_g$ of the polymer is from about 0.1 to about 5.0. In certain embodiments, the invention relates to any one of the aforementioned compositions, wherein the ratio of the effective diameter of the rod-shaped particles to $R_g$ of the polymer is from about 0.3 to about 2.0. In certain embodiments, the invention relates to any one of the aforementioned compositions, wherein the ratio of the effective diameter of the rod-shaped particles to $R_g$ of the polymer is about 1.0. In certain embodiments, the invention relates to any one of the aforementioned compositions, wherein the ratio of the effective diameter of the rod-shaped particles to $R_g$ of the polymer is about 1.0; and the polymer is polyethylene glycol. In certain embodiments, the invention relates to any one of the aforementioned compositions, wherein the ratio of the effective diameter of the rod-shaped particles to $R_g$ of the polymer is about 0.5. In certain embodiments, the invention relates to any one of the aforementioned compositions, wherein the ratio of the effective diameter of the rod-shaped particles to $R_g$ of the polymer is dextran.

In certain embodiments, the invention relates to any one of the aforementioned compositions, wherein the aligned rod-shaped particles form a two-dimensional array. In certain embodiments, the invention relates to any one of the aforementioned compositions, wherein the two-dimensional array is roughly circular in shape. In certain embodiments, the invention relates to any one of the aforementioned compositions, wherein the circle is from about 2 μm to about 1 cm in diameter. In certain embodiments, the invention relates to any one of the aforementioned compositions, wherein the circle is from about 5 μm to about 200 μm in diameter. In certain embodiments, the invention relates to any one of the aforementioned compositions, wherein the circle is from about 10 μm to about 100 μm in diameter.

In certain embodiments, the invention relates to any one of the aforementioned compositions, wherein the aligned rod-shaped particles form a two-dimensional array.

In certain embodiments, the invention relates to any one of the aforementioned compositions, wherein the two-dimensional array has an area from about 1 μm$^2$ to about 5 cm$^2$. In certain embodiments, the invention relates to any one of the aforementioned compositions, wherein the two-dimensional array has an area from about 0.3 mm$^2$ to about 5 mm$^2$. In certain embodiments, the invention relates to any one of the aforementioned compositions, wherein the two-dimensional array has an area from about 1 mm$^2$ to about 5 mm$^2$. In certain embodiments, the invention relates to any one of the aforementioned compositions, wherein the two-dimensional array has an area of greater than about 1 mm$^2$.

In certain embodiments, the invention relates to any one of the aforementioned compositions, wherein the rod-shaped particles are not fd viruses with a contour length of 880 nm, diameter of 7 nm, and persistence length of 2.8 μm; and the polymer is not dextran. In certain embodiments, the invention relates to any one of the aforementioned compositions, wherein the concentration of fd viruses is not 17 mg/mL. In certain embodiments, the invention relates to any one of the aforementioned compositions, wherein the concentration of dextran is not from 45 mg/mL to 53 mg/mL.

Exemplary Methods of forming an Array of Rod-Shaped Particles

In certain embodiments, the invention relates to a method of forming an array of aligned rod shaped particles. In certain embodiments, the invention relates to a method of forming any one of the aforementioned compositions. In certain embodiments, the invention relates to a method of adjusting the physical properties of any one of the aforementioned compositions or two-dimensional arrays.

In certain embodiments, the invention relates to a method of forming an array of aligned rod-shaped particles, comprising the step of:

combining in a first solvent a plurality of rod-shaped particles and a polymer, thereby forming a first solution, wherein the properties of the first solution are sufficient to overcome normal repulsive forces between the rod-shaped particles and cause the rod-shaped particles to align substantially parallel to one another, thereby forming a first array of aligned rod-shaped particles.

In certain embodiments, the invention relates to any one of the aforementioned methods, wherein the first array of aligned rod-shaped particles is in the form of a monolayer, a bilayer, or a multi-layer.

In certain embodiments, the invention relates to any one of the aforementioned methods, wherein the nature of the polymer causes the rod-shaped particles to align substantially parallel to one another.

In certain embodiments, the invention relates to any one of the aforementioned methods, wherein the concentration of the polymer causes the rod-shaped particles to align substantially parallel to one another.

In certain embodiments, the invention relates to any one of the aforementioned methods, wherein the size of the polymer causes the rod-shaped particles to align substantially parallel to one another.

In certain embodiments, the invention relates to any one of the aforementioned methods, wherein the nature of the first solvent causes the rod-shaped particles to align substantially parallel to one another.

In certain embodiments, the invention relates to any one of the aforementioned methods, wherein the distance between the aligned rod-shaped particles, the porosity of the array, the elasticity of the array, or the crystallinity of the array is dictated by the nature of the polymer, the concentration of the polymer, the size of the polymer, or the nature of the first solvent.

In certain embodiments, the invention relates to any one of the aforementioned methods, wherein the first solution further comprises a salt.

In certain embodiments, the invention relates to any one of the aforementioned methods, wherein the salt is monovalent.

In certain embodiments, the invention relates to any one of the aforementioned methods, wherein the salt is sodium chloride or potassium chloride.

In certain embodiments, the invention relates to any one of the aforementioned methods, wherein the salt is sodium chloride; and the sodium chloride is present in a concentration from about 1 mM to about 500 mM in the first solution.

In certain embodiments, the invention relates to any one of the aforementioned methods, wherein the salt is sodium chloride; and the sodium chloride is present in a concentration of about 50 mM in the first solution.

In certain embodiments, the invention relates to any one of the aforementioned methods, wherein the first solution further comprises tris(hydroxymethyl)aminomethane-HCl (tris-HCl).

In certain embodiments, the invention relates to any one of the aforementioned methods, wherein the tris-HCl is present in a concentration from about 1 mM to about 500 mM in the first solution. In certain embodiments, the invention relates to any one of the aforementioned methods, wherein the tris-HCl is present in a concentration from about 1 mM to about 15 mM in the first solution.

In certain embodiments, the invention relates to any one of the aforementioned methods, wherein the tris-HCl is present in a concentration of about 10 mM.

In certain embodiments, the invention relates to any one of the aforementioned methods, wherein the tris-HCl is present in a concentration of about 3.5 mM.

In certain embodiments, the invention relates to any one of the aforementioned methods, wherein the first solution further comprises a buffer.

In certain embodiments, the invention relates to any one of the aforementioned methods, wherein the first solution has pH from about 2.0 to about 12.0. In certain embodiments, the invention relates to any one of the aforementioned methods, wherein the first solution has pH from about 6.0 to about 10.0.

In certain embodiments, the invention relates to any one of the aforementioned methods, wherein the first solution has a pH of about 8.0.

In certain embodiments, the invention relates to any one of the aforementioned methods, further comprising the steps of combining the plurality of rod-shaped particles with a second solvent, thereby forming a second solution;

combining the polymer with a third solvent, thereby forming a third solution;

wherein the combination of the second solution and the third solution yields the first solution.

In certain embodiments, the invention relates to any one of the aforementioned methods, wherein the second solution and the third solution are mixed in a volume ratio of about 1:1.

In certain embodiments, the invention relates to any one of the aforementioned methods, wherein the second solvent is organic.

In certain embodiments, the invention relates to any one of the aforementioned methods, wherein the second solvent is inorganic.

In certain embodiments, the invention relates to any one of the aforementioned methods, wherein the rod-shaped particles are substantially soluble in the second solvent.

In certain embodiments, the invention relates to any one of the aforementioned methods, wherein the third solvent is organic.

In certain embodiments, the invention relates to any one of the aforementioned methods, wherein the polymer is substantially soluble in the third solvent.

In certain embodiments, the invention relates to any one of the aforementioned methods, further comprising the step of:

evaporating the first solvent.

In certain embodiments, the invention relates to any one of the aforementioned methods, wherein the rod-shaped polymers do no adsorb the polymer.

In certain embodiments, the invention relates to any one of the aforementioned methods, wherein the polymer comprises polyethylene glycol and polyethylene oxide.

In certain embodiments, the invention relates to any one of the aforementioned methods, wherein the wherein the polymer comprises dextran.

In certain embodiments, the invention relates to any one of the aforementioned methods, wherein the polymer comprises dextran with a number average molecular weight of from about 1,000 Da to about 2,000,000 Da. In certain embodiments, the invention relates to any one of the aforementioned methods, wherein the polymer comprises dextran with a number average molecular weight of from about 100,000 Da to about 800,000 Da.

In certain embodiments, the invention relates to any one of the aforementioned methods, wherein the polymer comprises dextran with a number average molecular weight of about 500,000 Da.

In certain embodiments, the invention relates to any one of the aforementioned methods, wherein the dextran is present in the first solution at a concentration from about 1 mg/mL to about 80 mg/mL. In certain embodiments, the invention relates to any one of the aforementioned methods, wherein the dextran is present in the first solution at a concentration from about 30 mg/mL to about 60 mg/mL.

In certain embodiments, the invention relates to any one of the aforementioned methods, wherein the dextran is present in the first solution at a concentration of about 40 mg/mL.

In certain embodiments, the invention relates to any one of the aforementioned methods, wherein the dextran is present in the first solution at a concentration of about 58 mg/mL.

In certain embodiments, the invention relates to any one of the aforementioned methods, wherein the polymer comprises polyethylene glycol.

In certain embodiments, the invention relates to any one of the aforementioned methods, wherein the polymer comprises polyethylene glycol with a number average molecular weight of from 100 Da to about 2,000,000 Da. In certain embodiments, the invention relates to any one of the aforementioned methods, wherein the polymer comprises polyethylene glycol with a number average molecular weight of from about 500 Da to about 2,000,000 Da. In certain embodiments, the invention relates to any one of the aforementioned methods, wherein the polymer comprises polyethylene glycol with a number average molecular weight of from about 2,000 Da to about 700,000 Da.

In certain embodiments, the invention relates to any one of the aforementioned methods, wherein the polymer comprises polyethylene glycol with a number average molecular weight of about 400,000 Da.

In certain embodiments, the invention relates to any one of the aforementioned methods, wherein the polyethylene glycol is present at a concentration from about 1 mg/mL to about 60 mg/mL. In certain embodiments, the invention relates to any one of the aforementioned methods, wherein the polyethylene glycol is present at a concentration from about 1 mg/mL to about 20 mg/mL.

In certain embodiments, the invention relates to any one of the aforementioned methods, wherein the polymer comprises poly(N-isopropylacrylamide).

In certain embodiments, the invention relates to any one of the aforementioned methods, wherein the polymer has a $R_g$ of from about 0.32 nm to about 80 nm. In certain embodiments, the invention relates to any one of the aforementioned methods, wherein the polymer has a $R_g$ of from about 0.5 nm to about 80 nm. In certain embodiments, the invention relates to any one of the aforementioned methods, wherein the polymer has a $R_g$ of from about 4 nm to about 40 nm.

In certain embodiments, the invention relates to any one of the aforementioned methods, wherein the rod-shaped particles are substantially homogeneous.

In certain embodiments, the invention relates to any one of the aforementioned methods, wherein the rod-shaped particles are selected from the group consisting of rigid rod-shaped particles and non-rigid rod-shaped particles.

In certain embodiments, the invention relates to any one of the aforementioned methods, wherein the rod-shaped particles are responsive to an energy source that enables energy-dependent movement of the particles.

In certain embodiments, the invention relates to any one of the aforementioned methods, wherein the rod-shaped particles comprise microtubules and nanomotors.

In certain embodiments, the invention relates to any one of the aforementioned methods, further comprising the step of:

altering the length or the diameter of the rod-shaped particles.

In certain embodiments, the invention relates to any one of the aforementioned methods, wherein the rod-shaped particles are selected from the group consisting of substantially homogeneous rod-shaped viruses and virus-like particles.

In certain embodiments, the invention relates to any one of the aforementioned methods, wherein the rod-shaped particles are selected from the group consisting of Tobacco Mosaic viruses, fd viruses, and M13 viruses.

In certain embodiments, the invention relates to any one of the aforementioned methods, wherein the rod-shaped particles are fd wild type viruses.

In certain embodiments, the invention relates to any one of the aforementioned methods, wherein the rod-shaped particles are fd Y21M viruses.

In certain embodiments, the invention relates to any one of the aforementioned methods, wherein the rod-shaped particles are M13 viruses.

In certain embodiments, the invention relates to any one of the aforementioned methods, wherein the rod-shaped particles are Tobacco Mosaic viruses.

In certain embodiments, the invention relates to any one of the aforementioned methods, wherein the rod-shaped particles are viruses; and the viruses have been genetically modified to introduce binding sites along the surface of the viruses.

In certain embodiments, the invention relates to any one of the aforementioned methods, wherein the rod-shaped particles are selected from the group consisting of nanorods, nanowires, nanocylinders, and nanotubes.

In certain embodiments, the invention relates to any one of the aforementioned methods, wherein the rod-shaped particles comprise organic material, inorganic material, or both.

In certain embodiments, the invention relates to any one of the aforementioned methods, wherein the rod-shaped particles comprise silver, gold, germanium, cadmium selenide, zinc oxide, or silicon.

In certain embodiments, the invention relates to any one of the aforementioned methods, wherein the repulsive forces are electrostatic in origin, steric in origin, or both.

In certain embodiments, the invention relates to any one of the aforementioned methods, wherein the rod-shaped particles are present in the first solution at a concentration from about 0.1 mg/mL to about 100 mg/mL. In certain embodiments, the invention relates to any one of the aforementioned methods, wherein the rod-shaped particles are present in the first solution at a concentration from about 0.2 mg/mL to about 40 mg/mL.

In certain embodiments, the invention relates to any one of the aforementioned methods, wherein the rod-shaped particles are present in the first solution at a concentration of about 5 mg/mL.

In certain embodiments, the invention relates to any one of the aforementioned methods, wherein the rod-shaped particles are from about 0.5 nm to about 50 nm in diameter. In certain embodiments, the invention relates to any one of the aforementioned methods, wherein the rod-shaped particles are from about 2 nm to about 50 nm in diameter.

In certain embodiments, the invention relates to any one of the aforementioned methods, wherein the rod-shaped particles are about 10 nm in diameter.

In certain embodiments, the invention relates to any one of the aforementioned methods, wherein the rod-shaped particles are about 35 nm in diameter.

In certain embodiments, the invention relates to any one of the aforementioned methods, wherein the rod-shaped particles have a persistence length from about 1 μm to about 20 mm.

In certain embodiments, the invention relates to any one of the aforementioned methods, wherein the rod-shaped particles have a persistence length of about 2.8 μm.

In certain embodiments, the invention relates to any one of the aforementioned methods, wherein the rod-shaped particles have a persistence length of about 9.9 μm.

In certain embodiments, the invention relates to any one of the aforementioned methods, wherein the rod-shaped particles have an aspect ratio (L/D) greater than about 5.

In certain embodiments, the invention relates to any one of the aforementioned methods, wherein the rod-shaped particles have an aspect ratio from about 5 to about 1000.

In certain embodiments, the invention relates to any one of the aforementioned methods, wherein the rod-shaped particles are separated by a distance. In certain embodiments, the distance between rod-shaped particles is the distance from the center of one particle to the center of another. In certain embodiments, the distance between rod-shaped particles is the distance between the long edge of one particle to the long edge of another. In certain embodiments, the invention relates to any one of the aforementioned methods, wherein the rod-shaped particles are separated by a distance of from about 0.5 nm to about 100 nm. In certain embodiments, the invention relates to any one of the aforementioned methods, wherein the rod-shaped particles are separated by an average distance of from about 0.5 nm to about 100 nm.

In certain embodiments, the invention relates to any one of the aforementioned methods, wherein the rod-shaped particles are separated by a distance of about 10 nm. In certain embodiments, the invention relates to any one of the aforementioned methods, wherein the rod-shaped particles are separated by an average distance of about 10 nm.

In certain embodiments, the invention relates to any one of the aforementioned methods, wherein the rod-shaped particles are separated by a distance of about 7 nm. In certain embodiments, the invention relates to any one of the aforementioned methods, wherein the rod-shaped particles are separated by an average distance of about 7 nm.

In certain embodiments, the invention relates to any one of the aforementioned methods, wherein the ratio of the effective diameter of the rod-shaped particles to $R_g$ of the polymer is from about 0.1 to about 5.0. In certain embodiments, the invention relates to any one of the aforementioned methods, wherein the ratio of the effective diameter of the rod-shaped particles to $R_g$ of the polymer is from about 0.3 to about 2.0. In certain embodiments, the invention relates to any one of the aforementioned methods, wherein the ratio of the effective diameter of the rod-shaped particles to $R_g$ of the polymer is about 1.0. In certain embodiments, the invention relates to any one of the aforementioned methods, wherein the ratio of the effective diameter of the rod-shaped particles to $R_g$ of the polymer is about 1.0; and the polymer is polyethylene glycol. In certain embodiments, the invention relates to any one of the aforementioned methods, wherein the ratio of the effective diameter of the rod-shaped particles to $R_g$ of the polymer is about 0.5. In certain embodiments, the invention relates to any one of the aforementioned methods, wherein the ratio of the effective diameter of the rod-shaped particles to $R_g$ of the polymer is dextran.

In certain embodiments, the invention relates to any one of the aforementioned methods, wherein the first array of aligned rod-shaped particles is two-dimensional.

In certain embodiments, the invention relates to any one of the aforementioned methods, wherein the two-dimensional array is roughly circular in shape. In certain embodiments, the invention relates to any one of the aforementioned methods, wherein the circle is from about 2 μm to about 1 cm in diameter. In certain embodiments, the invention relates to any one of the aforementioned methods, wherein the circle is from about 5 μm to about 200 μm in diameter. In certain embodiments, the invention relates to any one of the aforementioned methods, wherein the circle is from about 10 μm to about 100 μm in diameter.

In certain embodiments, the invention relates to any one of the aforementioned methods, wherein the two-dimensional array has an area from about 1 μm² to about 5 cm². In certain embodiments, the invention relates to any one of the aforementioned methods, wherein the two-dimensional array has an area from about 0.3 mm² to about 5 mm². In certain embodiments, the invention relates to any one of the aforementioned methods, wherein the two-dimensional array has an area from about 1 mm² to about 5 mm². In certain embodiments, the invention relates to any one of the aforementioned methods, wherein the two-dimensional array has an area of greater than about 1 mm².

In certain embodiments, the invention relates to any one of the aforementioned methods, wherein the rod-shaped particles are not fd viruses with a contour length of 880 nm, diameter of 7 nm, and persistence length of 2.8 μm; and the polymer is not dextran. In certain embodiments, the invention relates to any one of the aforementioned methods, wherein the concentration of fd viruses is not 17 mg/mL. In certain embodiments, the invention relates to any one of the aforementioned methods, wherein the concentration of dextran is not from 45 mg/mL to 53 mg/mL.

Exemplary Three-Dimensional Structures

In certain embodiments, the invention relates to a three-dimensional structure, comprising any one of the aforementioned compositions or two dimensional arrays.

In certain embodiments, the invention relates to any one of the aforementioned three-dimensional structures, wherein the three-dimensional structure is a vesicle.

Exemplary Arrays of Pores

In certain embodiments, the invention relates to a composition, wherein the composition comprises:
a plurality of pores aligned substantially parallel to one another.

In certain embodiments, the invention relates to a composition, wherein the composition comprises:
a cross-linked polymer; and
a plurality of pores
wherein the pores are aligned substantially parallel to one another.

In certain embodiments, the invention relates to any one of the aforementioned compositions, wherein the composition further comprises a solvent.

In certain embodiments, the invention relates to any one of the aforementioned compositions, wherein the composition further comprises a salt. In certain embodiments, the invention relates to any one of the aforementioned compositions, wherein the salt is monovalent. In certain embodiments, the invention relates to any one of the aforementioned compositions, wherein the salt is sodium chloride or potassium chloride. In certain embodiments, the invention relates to any one of the aforementioned compositions, wherein the salt is sodium chloride; and the sodium chloride is present in a concentration from about 1 mM to about 500 mM. In certain embodiments, the invention relates to any one of the aforementioned compositions, wherein the salt is sodium chloride; and the sodium chloride is present in a concentration of about 50 mM.

In certain embodiments, the amount of salt determines the effective diameter of the rod-shaped particles. In certain embodiments, the concentration of salt dictates the size of the polymer.

In certain embodiments, the invention relates to any one of the aforementioned compositions, wherein the composition further comprises tris(hydroxymethyl)aminomethane-HCl (tris-HCl). In certain embodiments, the invention relates to any one of the aforementioned compositions, wherein the tris-HCl is present in a concentration from about 1 mM to about 500 mM. In certain embodiments, the invention relates to any one of the aforementioned compositions, wherein the tris-HCl is present in a concentration from about 1 mM to about 15 mM. In certain embodiments, the invention relates to any one of the aforementioned compositions, wherein the tris-HCl is present in a concentration of about 10 mM. In certain embodiments, the invention relates to any one of the aforementioned compositions, wherein the tris-HCl is present in a concentration of about 3.5 mM.

In certain embodiments, the invention relates to any one of the aforementioned compositions, wherein the composition further comprises a buffer.

In certain embodiments, the invention relates to any one of the aforementioned compositions, wherein the composition has a pH from about 2.0 to about 12.0. In certain embodiments, the invention relates to any one of the aforementioned compositions, wherein the composition has a pH from about 6.0 to about 10.0. In certain embodiments, the invention relates to any one of the aforementioned compositions, wherein the composition has a pH of about 8.0.

In certain embodiments, the invention relates to any one of the aforementioned compositions, wherein the solvent comprises an organic solvent or an inorganic solvent. In certain embodiments, the invention relates to any one of the aforementioned compositions, wherein the solvent is organic. In certain embodiments, the invention relates to any one of the aforementioned compositions, wherein the solvent is inorganic. In certain embodiments, the invention relates to any one of the aforementioned compositions, wherein the solvent comprises an organic solvent and an inorganic solvent.

In certain embodiments, the invention relates to any one of the aforementioned compositions, wherein the polymer comprises polyethylene glycol and polyethylene oxide.

In certain embodiments, the invention relates to any one of the aforementioned compositions, wherein the polymer comprises dextran.

In certain embodiments, the invention relates to any one of the aforementioned compositions, wherein the polymer comprises dextran with a number average molecular weight of from about 1,000 Da to about 2,000,000 Da. In certain embodiments, the invention relates to any one of the aforementioned compositions, wherein the polymer comprises dextran with a number average molecular weight of from about 100,000 Da to about 800,000 Da.

In certain embodiments, the invention relates to any one of the aforementioned compositions, wherein the polymer comprises dextran with a number average molecular weight of about 500,000 Da.

In certain embodiments, the invention relates to any one of the aforementioned compositions, wherein the dextran is present in the composition at a concentration from about 1 mg/mL to about 80 mg/mL. In certain embodiments, the invention relates to any one of the aforementioned compositions, wherein the dextran is present in the composition at a concentration from about 30 mg/mL to about 60 mg/mL.

In certain embodiments, the invention relates to any one of the aforementioned compositions, wherein the dextran is present in the composition at a concentration of about 40 mg/mL.

In certain embodiments, the invention relates to any one of the aforementioned compositions, wherein the dextran is present in the composition at a concentration of about 58 mg/mL.

In certain embodiments, the invention relates to any one of the aforementioned compositions, wherein the polymer comprises polyethylene glycol.

In certain embodiments, the invention relates to any one of the aforementioned compositions, wherein the polymer comprises polyethylene glycol with a number average molecular weight of from 100 Da to about 10,000,000 Da. In certain embodiments, the invention relates to any one of the aforementioned compositions, wherein the polymer comprises polyethylene glycol with a number average molecular weight of from about 300 Da to about 10,000,000 Da. In certain embodiments, the invention relates to any one of the aforementioned compositions, wherein the polymer comprises polyethylene glycol with a number average molecular weight of from about 2,000 Da to about 700,000 Da.

In certain embodiments, the invention relates to any one of the aforementioned compositions, wherein the polymer comprises polyethylene glycol with a number average molecular weight of about 400,000 Da.

In certain embodiments, the invention relates to any one of the aforementioned compositions, wherein the polyethylene glycol is present at a concentration from about 1 mg/mL to about 60 mg/mL. In certain embodiments, the invention relates to any one of the aforementioned compositions, wherein the polyethylene glycol is present at a concentration from about 1 mg/mL to about 20 mg/mL.

In certain embodiments, the invention relates to any one of the aforementioned compositions, wherein the polymer comprises poly(N-isopropylacrylamide).

In certain embodiments, the invention relates to any one of the aforementioned compositions, wherein the polymer has a $R_g$ of from about 0.32 nm to about 80 nm. In certain embodiments, the invention relates to any one of the aforementioned compositions, wherein the polymer has a $R_g$ of from about 0.5 nm to about 80 nm. In certain embodiments, the invention relates to any one of the aforementioned compositions, wherein the polymer has a $R_g$ of from about 4 nm to about 40 nm.

In certain embodiments, the invention relates to any one of the aforementioned compositions, wherein pores are from about 0.5 nm to about 100 nm in diameter. In certain embodiments, the invention relates to any one of the aforementioned compositions, wherein pores are from about 2 nm to about 50 nm in diameter.

In certain embodiments, the invention relates to any one of the aforementioned compositions, wherein the pores are about 10 nm in diameter.

In certain embodiments, the invention relates to any one of the aforementioned compositions, wherein the pores are about 35 nm in diameter.

In certain embodiments, the invention relates to any one of the aforementioned compositions, wherein the pores are separated by a distance. In certain embodiments, the distance between pores is the distance from the center of one pore to the center of another. In certain embodiments, the distance between pores is the distance between the edge of one pore to the edge of another. In certain embodiments, the invention relates to any one of the aforementioned compositions, wherein pores are separated by a distance of from about 0.5 nm to about 100 nm. In certain embodiments, the invention relates to any one of the aforementioned compositions, wherein the pores are separated by an average distance of from about 0.5 nm to about 100 nm.

In certain embodiments, the invention relates to any one of the aforementioned compositions, wherein the pores are separated by a distance of about 10 nm. In certain embodiments, the invention relates to any one of the aforementioned compositions, wherein the pores are separated by an average distance of about 10 nm.

In certain embodiments, the invention relates to any one of the aforementioned compositions, wherein pores are separated by a distance about 7 nm. In certain embodiments, the invention relates to any one of the aforementioned compositions, wherein the pores are separated by an average distance of about 7 nm.

In certain embodiments, the invention relates to any one of the aforementioned compositions, wherein composition is a two-dimensional array of substantially parallel pores. In certain embodiments, the invention relates to any one of the aforementioned compositions, wherein the two-dimensional array is roughly circular in shape. In certain embodiments, the invention relates to any one of the aforementioned compositions, wherein the circle is from about 2 μm to about 1 cm in diameter. In certain embodiments, the invention relates to any one of the aforementioned compositions, wherein the circle is from about 5 μm to about 200 μm in diameter. In certain embodiments, the invention relates to any one of the aforementioned compositions, wherein the circle is from about 10 μm to about 100 μm in diameter.

In certain embodiments, the invention relates to any one of the aforementioned compositions, wherein the two-dimensional array has an area from about 1 μm$^2$ to about 5 cm$^2$. In certain embodiments, the invention relates to any one of the aforementioned compositions, wherein the two-dimensional array has an area from about 0.3 mm$^2$ to about 5 mm$^2$. In certain embodiments, the invention relates to any one of the aforementioned compositions, wherein the two-dimensional array has an area of greater than about 1 mm$^2$.

Exemplary Methods of Forming an Array of Pores

In certain embodiments, the invention relates to any one of the aforementioned methods, further comprising the step of:
contacting the first solution with a fixating agent.

In certain embodiments, the invention relates to any one of the aforementioned methods, wherein the fixating agent comprises acrylamide or bis-acrylamide. In certain embodiments, the invention relates to any one of the aforementioned methods, wherein the fixating agent comprises agar. In certain embodiments, the invention relates to any one of the aforementioned methods, wherein the fixating agent comprises a cross-linking agent. In certain embodiments, the invention relates to any one of the aforementioned methods, wherein the fixating agent comprises a UV-initiated cross-linking agent. In certain embodiments, the invention relates to any one of the aforementioned methods, wherein the fixating agent is 2-hydroxy-4'-(2-hydroxy-ethoxy)-2-methyl-propiophenone.

In certain embodiments, the invention relates to any one of the aforementioned methods, further comprising the step of: exposing the first solution to radiation, thereby effecting cross-linking of the cross-linkable polymer and the cross-linking agent.

In certain embodiments, the invention relates to any one of the aforementioned methods, wherein the rod-shaped particles are viruses; and the viruses have been genetically modified to introduce binding sites along the surface of the viruses; further comprising the step of:
contacting the first solution with a biomineralization agent.

In certain embodiments, the invention relates to any one of the aforementioned methods, wherein the biomineralization agent is selected from the group consisting of silver, gold, germanium, cadmium selenide, zinc oxide, and silicon.

In certain embodiments, the invention relates to any one of the aforementioned methods, further comprising the step of:
removing the rod-shaped particles from the array, thereby forming a composition comprising a plurality of substantially parallel pores.

EXEMPLIFICATION

It should be appreciated that the particular implementations shown and described herein are examples of the invention and are not intended to otherwise limit the scope of the present invention in any way. The use of filamentous viruses such as fd or M13 viruses, or Tobacco Mosaic viruses as model rod-like molecules herein was chosen for their unique advantages in demonstrating the feasibility and applicability of the methods used herein and to outline general conditions for the assembly of a wide class of homogenous rod-like molecules. Through genetic modifications, particles with different lengths, diameters, flexibilities, and charge distributions were created. Different polymers with different characteristics, such as branched polymers like Dextran For the sake of brevity, conventional electronics, manufacturing, semiconductor devices, and nanowire (NW), nanorod, nanotube, and nanoribbon technologies and other functional aspects of the systems (and components of the individual operating components of the systems) may not be described in detail herein. Furthermore, for purposes of brevity, the invention is frequently described herein as pertaining to nanorods, viruses, colloids, and colloidal rods, and the arrays are frequently referred to membranes and surfaces. These terms and combinations thereof are used interchangeably.

Large quantities filamentous bacteriophages (fd and M13 viruses) were grown using standard biological techniques. Polymers polyethylene glycol and dextran of various molecular weights, tris-HCl and sodium chloride were purchased from Sigma Aldrich, and used as received. Stock solutions of polymer at known concentrations were prepared in buffered solutions.

All microscopic observations were made using an inverted Nikon TE-2000 Microscope equipped with Differential Interference, Phase Contrast, and Fluorescence Microscopy. For fluorescence studies, virus particles were labeled with Alexa-488 dye purchased from Molecular Probes.

Example 1

Colloidal Membranes (Method 1)

Purified stock solutions of virus were prepared at concentrations of 10 mg/mL in buffer. Viruses suspended in buffer were mixed together in eppendorf tubes with polymer stock solutions at 1:1 volume ratios. Samples were vortexed for approximately 10 seconds. Immediately after mixing, the solutions turned turbid. Small volumes were extracted and placed between a coverslip and slide for microscopic observation.

Example 2 fd Wild-Type Membranes

Samples were prepared according to Example 1 using the fd wild-type virus suspended in a buffer of 100 mM NaCl, 20 mM Tris, at pH=8.0. Under these ionic conditions, fd rods have an effective diameter of about 10 nm. fd wild-type viruses are slightly flexible with a persistence length of 2.8 µm. fd viruses were mixed together with Dextran polymer, molecular weight 500,000. Large arrays (10-100 µm in diameter) were observed over polymer concentrations ranging from 40 mg/mL to 58 mg/mL. Above 58 mg/mL, stacks of membranes, or multi-layer arrays, were observed. Internal fluid-like structure in all cases was confirmed via fluorescence microscopy by visualizing the behavior of individually fluorescently labeled viruses.

Example 3 fd Y21M Membranes

Samples were prepared according to Example 1 using the fd Y21M virus suspended in a buffer of 100 mM NaCl, 20 mM Tris, at pH=8.0. Under these ionic conditions, fd Y21M rods have an effective diameter of about 10 nm. fd Y21M mutant viruses are more rigid than the wild-type viruses with a persistence length of 9.9 µm. fd viruses Y21M were mixed together with Dextran polymer, molecular weight 500,000. Large arrays (10-100 µm in diameter) were observed over polymer concentrations ranging from 35 mg/mL to 50 mg/mL. Above 50 mg/mL, stacks of membranes, or multi-layer arrays, were observed. Internal fluid-like structure in all cases was confirmed via florescence microscopy, and the behavior of individually fluorescently labeled viruses. The decrease in polymer concentration needed to drive the formation of aligned arrays is due to the increase in rod rigidity, i.e., the more rigid the rod, the less osmotic pressure needed to align rods and "freeze" out entropic degrees of freedom.

Example 4

TMV Membranes

Samples were prepared according to Example 1 using the TMV virus suspended in a buffer of 7 mM Tris, at pH=8.0. Under these ionic conditions, TMV rods have an effective diameter of ~35 nm. TMV rods were mixed together with PEG polymers, molecular weight 400,000. Large arrays (10-100 µm in diameter) were observed over polymer concentrations ranging from 5 mg/mL to 10 mg/mL. The decrease in polymer concentration needed to drive the formation of aligned arrays is due to the increase in rod rigidity, i.e., the more rigid the rod, the less osmotic pressure needed to align rods and "freeze" out entropic degrees of freedom. The increase in polymer size is due to the fact that TMV has a much larger diameter.

Example 5

Colloidal Membranes (Method 2)

Purified stock solutions of virus were prepared at concentrations of 10 mg/mL in buffer. Viruses suspended in buffer were mixed together in eppendorf tubes with polymer stock solutions at 1:1 volume ratios. Fixating agents such as acrylamide/bis-acrylamide were added to suspension, in addition to a UV-initiated cross-linking agent. Samples were vortexed for approximately 10 seconds. Immediately after mixing, the solutions turned turbid. Upon exposure to UV light, self-assembled structures were fixated.

Example 6

Rio-Mineralized Membranes

Samples were prepared according to Example 5. The final concentration of acrylamide was 2.8% and the concentration of bis-acrylamide was 0.2%. After fixating the sample and holding the arrays in place, gelled samples were transferred to baths containing biomineralization agents which absorb onto the virus surface.

Example 7 fd Virus and PEG Mixtures—Comparison with Simulated Values

Suspensions of model rod-like particles, the filamentous bacteriophage fd virus, were prepared in a buffered solution with salt (100 mM NaCl, 20 mM Tris, pH=8.0). Under these conditions, fd viruses behave as model hard rod-like molecules, and hardcore repulsive interactions are the dominant contributions to the internal energy. fd rods have a large aspect ratio of approximately 130 (length of 880 nm and diameter of 7 nm), and undergo isotropic to nematic as well as nematic to smectic phase transitions with increasing concentration. The rods are slightly flexible, with a persistence length of 2.8 µm. The finite flexibility of the rods drives membrane condensation conditions to higher depletant concentrations. In these studies, polyethylene glycol (PEG) and polyethylene oxide were used as the depletion agents to drive self-assembly. These polymers are chemically identical, and have radii of gyration that scale with molecular weight $M_w$ according to $R_g(nm)=0:0215 M_w^{0.583}$.

Example 8

Simulation Details

The number of rods in simulations ranged from $128 \leq N_r \leq 49920$. For most free energy calculations $N_r=512$, in simulations that examine finite size effects $128 \leq N_r \leq 1152$, in the simulations with orientational fluctuations $N_r=1560$, and simulations used to measure height-height correlations considered $N_r=1024$ and $N_r=49,920$. The latter simulations were performed with rod lengths of L=20 and L=100, for which there were for which there were approximately $6.3 \times 10^5$ and $1.3 \times 10^5$ spheres, respectively. For these large simulations the Monte Carlo simulations were performed in parallel via domain decomposition. For L=100 move attempts in which rod orientations deviated by more than 0.4 rad from the average rod orientation were rejected in order to enable efficient domain decomposition. Such rejections were exceptionally rare since rods are highly ordered within membranes, and system properties were not affected. No constraints were applied to simulations with L=20. For free energy calculations with orientational fluctuations and large aspect ratios, rods are allowed to interact with multiple periodic images of other rods and orientational fluctuations beyond a maximum angle are rejected to prevent any rod from interacting with itself. The maximum allowed angle was well beyond typical orientational fluctuations since rods in membranes are nearly aligned. Varying the maximal allowed angle showed that the constraint did not affect the free energy.

Example 9

Membranes formed from fd Virus and PEG/PEO—Comparison with Simulated Values

Simulations predicted a critical depletant size above which isolated membranes are unstable with respect to stacks of membranes for all osmotic pressures. This prediction was verified experimentally using a mixture of fd virus and non-adsorbing polymers. As shown in FIG. 10, there is qualitative agreement between simulations and experiments in two respects. First, colloidal membranes are unstable for depleting polymer of large size; i.e., there is a direct transition from the nematic phase to smectic filaments. In contrast, for smaller polymer sizes, colloidal membranes are stable. Second, with decreasing polymer size, the osmotic pressure (polymer concentration) at the transition from colloidal membranes to smectic filaments increases. Several points need to be considered when comparing the experimental and computational phase diagrams. First, there is a gap in the data between the polymer sizes corresponding to $R_g=9:7$ nm and $R_g=17:9$ nm due to limited commercial availability of polymers with appropriate size. Second, the transition pressure from the nematic/isotropic phase to colloidal membranes increases precipitously for smaller polymer sizes ($R_g</\sim 5.2$ nm). This is due to the deviations of the fd system from an ideal model hard rod system due to its surface charge. Making the depleting polymer size smaller than the electrostatic repulsion length greatly reduces the strength of the attractive interactions, requiring a higher depletant concentration to induce condensation of colloidal membranes. Third, while the chirality of the individual viruses can influence the assembly pathways, the locations of transitions in the experimental phase diagram are independent of the chirality of the constituent rods.

INCORPORATION BY REFERENCE

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to incorporate into this application any and all materials and information from any such articles, patents, patent applications, or other physical and electronic documents.

EQUIVALENTS

The invention has been described broadly and generically herein. Those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. Further, each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

We claim:

1. A porous polymer membrane comprising:
    a cross-linked polymer that is the reaction product of one or more polymer units and one or more fixating agents, whereby the one or more fixating agents covalently cross-link the polymer units; and
    a plurality of pores aligned substantially parallel to one another across the membrane and normal to the membrane surface, wherein the pores are from about 0.5 nm to about 100 nm in diameter, and the pores are separated by a distance of from about 0.5 nm to about 100 nm.

2. The porous polymer membrane of claim 1, wherein the cross-linked polymer is the reaction product of a composition that comprises the one or more polymer units and the one or more fixating agents in a solvent.

3. The porous polymer membrane of claim 2, wherein the composition further comprises a salt.

4. The porous polymer membrane of claim 2, wherein the composition further comprises tris(hydroxymethyl)aminomethane-HCl (tris-HCl).

5. The porous polymer membrane of claim 2, wherein the composition further comprises a buffer.

6. A porous polymer membrane comprising:
    a cross-linked polymer that is the reaction product of one or more polymer units and one or more fixating agents, whereby the one or more fixating agents covalently cross-link the polymer units; and
    a plurality of pores aligned substantially parallel to one another across the membrane,
    wherein the polymer comprises polyethylene glycol and polyethylene oxide.

7. The porous polymer membrane of claim 1, wherein the polymer comprises dextran.

8. The porous polymer membrane of claim 1, wherein the polymer comprises poly(N-isopropylacrylamide).

9. The porous polymer membrane of claim 1, wherein the polymer has a radius of gyration ($R_g$) of from about 0.5 nm to about 80 nm.

10. The porous polymer membrane according to claim 1, wherein the plurality of pores are formed according to a process comprising:
    combining a solvent, the one or more polymer units, a plurality of rod-shaped particles, and one or more fixating agents to form a colloidal membrane comprising an array of aligned rod-shaped particles;

inducing covalent cross-linking of the one or more fixating agents to the one or more polymer units, thereby forming the membrane comprising the cross-linked polymer; and removing the rod-shaped particles from the membrane to form said plurality of pores.

11. The porous polymer membrane according to claim 10, wherein the process further comprises, prior to said removing, contacting the rod-shaped particles with a biomineralization agent.

12. The porous polymer membrane according to claim 11, wherein the rod-shaped particles are virus particles and said removing comprises heating the membrane to remove the virus particles.

13. The porous polymer membrane according to claim 10, wherein the ratio of the effective diameter of the rod-shaped particles to the $R_g$ of the polymer is 0.1 to 5.0.

14. The porous polymer membrane according to claim 10, wherein the ratio of the effective diameter of the rod-shaped particles to the $R_g$ of the polymer is 0.3 to 2.0.

15. The porous polymer membrane according to claim 10, wherein the rod-shaped particles have a length to diameter aspect ratio that is greater than 5.

16. The porous polymer membrane according to claim 10, wherein the rod-shaped particles have a length to diameter aspect ratio that is from 5 to 1000.

17. The porous polymer membrane according to claim 1, wherein the one or more fixating agents is acrylamide, bisacrylamide, a combination of acrylamide and bisacrylamide, or 2-hydroxy-4'-(2-hydroxy-ethoxy)-2-methyl-propriophenone.

18. The porous polymer membrane according to claim 10, wherein the one or more fixating agents is acrylamide, bisacrylamide, a combination of acrylamide and bisacrylamide, or 2-hydroxy-4'-(2-hydroxy-ethoxy)-2-methyl-propriophenone; and wherein said inducing comprises exposing the colloidal membrane to UV radiation.

19. A polymer membrane comprising:

a cross-linked polymer that is the reaction product of one or more polymer units and one or more fixating agents, whereby the one or more fixating agents covalently cross-link the polymer units;

a plurality of pores aligned substantially parallel to one another across the membrane and normal to the membrane surface; and a plurality of rod-shaped particles self-assembled to form an array of said particles that is present within each of the plurality of pores;

wherein the pores are from about 0.5 nm to about 100 nm in diameter, and the pores are separated by a distance of from about 0.5 nm to about 100 nm.

20. The polymer membrane according to claim 19, wherein the polymer membrane is prepared according to the process comprising:

combining a solvent, the one or more polymer units, a plurality of rod-shaped particles, and one or more fixating agents to form a colloidal membrane comprising an array of aligned rod-shaped particles arranged as a smectic phase in the colloidal membrane; and inducing covalent cross-linking of the one or more fixating agents to the one or more polymer units, thereby forming the membrane comprising the cross-linked polymer with the plurality of rod-shaped particles arranged perpendicular to the membrane surface.

\* \* \* \* \*